United States Patent
Lee

(10) Patent No.: US 11,218,783 B2
(45) Date of Patent: Jan. 4, 2022

(54) VIRTUAL INTERACTIVE AUDIENCE INTERFACE

(71) Applicant: ESB LABS, Inc., Bayside, NY (US)

(72) Inventor: Ira Lee, Bayside, NY (US)

(73) Assignee: ESB LABS, Inc., Bayside, NY (US)

(*) Notice: Subject to any disclaimer, the term of this patent is extended or adjusted under 35 U.S.C. 154(b) by 0 days.

(21) Appl. No.: 16/962,714

(22) PCT Filed: Jan. 17, 2019

(86) PCT No.: PCT/US2019/013949
§ 371 (c)(1),
(2) Date: Jul. 16, 2020

(87) PCT Pub. No.: WO2019/143780
PCT Pub. Date: Jul. 25, 2019

(65) Prior Publication Data
US 2020/0359108 A1    Nov. 12, 2020

Related U.S. Application Data

(60) Provisional application No. 62/619,404, filed on Jan. 19, 2018, provisional application No. 62/619,353, (Continued)

(51) Int. Cl.
*H04N 21/81* (2011.01)
*H04H 60/33* (2008.01)
*H04N 21/218* (2011.01)
*H04N 21/2187* (2011.01)
*H04H 60/65* (2008.01)
(Continued)

(52) U.S. Cl.
CPC ........ *H04N 21/8146* (2013.01); *H04H 60/33* (2013.01); *H04N 21/2187* (2013.01); *H04N 21/21805* (2013.01); *H04N 21/8106* (2013.01)

(58) Field of Classification Search
CPC .............. H04H 60/33; H04N 21/8146; H04N 21/21805; H04N 21/2187; H04N 21/8106; H04N 21/235; H04N 21/42201; H04N 21/42204; H04N 21/4302; H04N 21/4307;
(Continued)

(56) References Cited

U.S. PATENT DOCUMENTS

2007/0021973 A1* 1/2007 Stremler ............ G06Q 30/0279
705/1.1
2012/0249719 A1 10/2012 Lemmey et al.
(Continued)

FOREIGN PATENT DOCUMENTS

EP         2582145        4/2013
KR  10-2017-0131059       11/2017
WO       2003/058518       7/2003

*Primary Examiner* — Alexander Gee
(74) *Attorney, Agent, or Firm* — Fay Kaplun & Marcin, LLP

(57) ABSTRACT

Embodiments provide methods and systems for creating virtual audiences and for facilitating remote audience participation. An example embodiment for creating a virtual audience begins by providing a digital feed from a performance area to a remotely located audience. In turn, such a method receives feedback from the remotely located audience and provides an output at the performance area corresponding to at least a portion of the received feedback.

21 Claims, 18 Drawing Sheets

Related U.S. Application Data filed on Jan. 19, 2018, provisional application No. 62/671,578, filed on May 15, 2018.

(51) Int. Cl.
  *H04H 60/66*     (2008.01)
  *A63D 15/20*     (2006.01)
  *H04N 21/442*    (2011.01)
  *H04N 21/475*    (2011.01)
  *H04N 21/8545*   (2011.01)

(58) Field of Classification Search
  CPC .............. H04N 21/431; H04N 21/435; H04N 21/4415; H04N 21/44218; H04N 21/8126
  See application file for complete search history.

(56) References Cited

U.S. PATENT DOCUMENTS

| | | | |
|---|---|---|---|
| 2013/0002794 A1* | 1/2013 | Hines | H04L 65/4076 348/14.01 |
| 2013/0097635 A1* | 4/2013 | Yerli | H04N 21/2187 725/37 |
| 2014/0007147 A1* | 1/2014 | Anderson | H04N 21/2665 725/9 |
| 2014/0250196 A1* | 9/2014 | Joao | G06F 16/951 709/206 |
| 2014/0358520 A1* | 12/2014 | Davey | G10L 15/08 704/9 |

\* cited by examiner

VIRTUAL INTERACTIVE AUDIENCE INTERFACE

RELATED APPLICATIONS

This application claims the benefit of U.S. Provisional Application No. 62/671,578, filed on May 15, 2018, U.S. Provisional Application No. 62/619,353, filed on Jan. 19, 2018, and U.S. Provisional Application No. 62/619,404, filed on Jan. 19, 2018. The entire teachings of the above applications are incorporated herein by reference.

BACKGROUND

Advances in data processing and transfer have led to an increase in distributed event viewing. Increasingly, performances, such as plays, sporting events, and concerts are viewed by multiple people who are distributed globally.

SUMMARY OF THE INVENTION

Methods and systems are needed to enhance real-world event experiences due to the increase in distributed viewership and, for similar reasons, to improve the remote viewing experience. To this end, embodiments of the present invention provide methods and systems for generating virtual audiences and for facilitating audience participation that provide improved event viewing for both remote and local audiences.

An example embodiment of the present invention is directed to a system for creating a virtual audience. Such a system includes a communications interface configured to provide a digital feed from a performance area to a remotely located audience and to receive feedback from the remotely located audience. Further, the example system includes a controller configured to provide an output at the performance area corresponding to at least a portion of the received feedback. According to an embodiment of the system, the performance area can be an arena, a billiard table, and a stage.

In an example embodiment, the remotely located audience comprises a plurality of remotely located audiences, each at a geographic location. According to such an example embodiment, the communications interface of the system may be further configured to receive feedback from each of the plurality of remotely located audiences. Further, in another example embodiment, the controller is configured to aggregate the feedback received by the communications interface from each of the plurality of remotely located audiences. In such an embodiment, the output provided by the controller at the performance area is based on the aggregated feedback.

According to another example embodiment, the feedback from the remotely located audience is any such feedback known in the art, including at least one of: clapping, stomping, booing, a spoken statement, and text. In another embodiment, the communications interface is further configured to provide the remotely located audience with a listing of feedback options corresponding to feedback the communications interface is configured to receive. In such an embodiment, the feedback received by the communications interface comprises at least one feedback from the provided listing of feedback options.

In yet another embodiment of the system, the communications interface is configured to provide a digital feed to the remotely located audience by connecting to at least one electronic device of at least one member of the remotely located audience. In another embodiment, feedback received by the communications interface comprises a signal representing motion of the electronic device of at least one member of the remotely located audience. According to such an embodiment, the signal representing motion of the electronic device represents at least one of: contact between the at least one member of the remotely located audience and the electronic device and movement of the electronic device. Similarly, according to another embodiment, feedback received by the communications interface comprises a signal representing motion of an electronic device of at least one member of the remotely located audience.

One aspect of the system, according to an embodiment, allows a digital feed to be provided and feedback to be received at various times. In one such system embodiment, the communications interface is configured to receive feedback from the remotely located audience in real-time and the controller is configured to provide output at the performance area in real-time. According to another embodiment, a digital feed from the performance area provided by the communications interface is a broadcast of an event at the performance area. In such an embodiment, the communications interface is configured to be able to provide the digital feed after a time at which the event occurred. Similarly, according to such an embodiment, the communications interface is configured to be able to receive the feedback after the time at which the event occurred. Similarly, in yet another embodiment, the communications interface is further configured to receive additional feedback after the time at which the event occurred and the controller is further configured to aggregate the feedback with the additional feedback.

In another aspect of the present invention, the system is configured to provide a customized output to one or more members of the remotely located audience. In such an embodiment, the controller is further configured to determine an audience output that is to be provided to a subset, which includes at least one member, of the remotely located audience and the communications interface is further configured to provide the determined audience output to the subset of the remotely located audience. According to an embodiment, the controller is configured to determine which members of the remotely located audience are to receive the audience output and the communications interface is configured to provide the audience output to the determined members. The audience output in such an embodiment may be in any variety of different forms and may be in any variety of different data types. For instance, in one such example embodiment, the audience output determined by the controller includes aggregated feedback that is generated by the controller from feedback received at the communications interface from multiple members of the remotely located audience. According to an embodiment, the controller is further configured to synthesize the feedback received by the communications interface from the remotely located audience with the aggregated feedback to determine the audience output. This audience output would allow a member of the remotely located audience to perceive his own feedback among feedback from other members of the remotely located audience as if the remotely located audience member is local to an event, even if that is not the case.

In yet another embodiment, the audience output determined by the controller informs at least one member of the remotely located audience of impropriety of received feedback. In this way, in such an embodiment the system polices remotely located audience members. According to another embodiment, the audience output includes data metrics regarding at least one of: members of the remotely located audience, the performance area, an event at the performance area, and received feedback. In an embodiment where the controller is configured to determine an audience output for a subset of the remotely located audience, the controller is configured to use feedback from members of the remotely located audience, other than the subset of the remotely located audience receiving the audience output, to determine the audience output.

In an alternative embodiment of the system, the output provided by the controller at the performance area is enhanced. In yet another embodiment, the output provided by the controller at the performance area is based on a user selected artificial audience size. According to such an embodiment, the controller, in providing the output at the performance area, is further configured to utilize the user selected audience size to adjust the received feedback to correspond to the user selected audience size.

The controller, according to another embodiment, is further configured to provide output at the performance area based on an event in the performance area. In such an embodiment, the controller is configured to delay providing the output at the performance area, based on an event in the performance area, as a result of a component of the event in the performance area. In another embodiment, the controller is configured to use a simulation of the event to provide the output at the performance area as a result of a component of the event in the performance area.

In another embodiment of the system, feedback received by the communications interface includes feedback from a plurality of members of a remotely located audience and the controller is configured to aggregate the feedback received from the plurality of members of the remotely located audience to provide the output at the performance area. In such an embodiment, in order to provide the output at the performance area, the controller is configured to utilize frequency that a particular feedback type occurs in the aggregated feedback to provide the output at the performance area.

In an example embodiment, feedback received by the communications interface comprises voice feedback. In such an embodiment, the controller may be further configured to remove at least a portion of language in the received feedback. According to such an embodiment, the removed language can include offensive language. Likewise, in an embodiment, the communications interface can be further configured to ban a member of the remotely located audience based on an internet protocol address associated with the banned audience member. Similarly, in yet another embodiment, the controller is further configured to remove one or more inappropriate responses from the received feedback.

According to yet another system embodiment, output provided by the controller at the performance area comprises at least one physical change to the performance area. In such an embodiment, the at least one physical change to the performance area is effected through at least one of: a streamer, a fan, confetti, a motor, an actuator, a robot, a light, a fog machine, and a speaker. According to another embodiment, the controller is configured to provide output at the performance area that is based on a theme selected from a plurality of themes. In such an embodiment, the theme may be determined by a proportion of members of the remotely located audience. In another embodiment, the output at the performance area includes at least one of: sound, video, text, motion, scent, and an aggregated and collective rendering of the received feedback. In an embodiment, the output provided by the controller is perceptible at the performance area, i.e., can be sensed at the performance area. Further, in yet another embodiment, the controller is configured to provide the output at the performance area via at least one avatar.

In yet another embodiment, the communications interface is further configured to provide a graphical representation of audience participation to at least one member of the remotely located audience. In another embodiment, the communications interface is further configured to provide a custom feed to at least one member of the remotely located audience. Further still, in yet another embodiment, the communications interface is configured to receive feedback from a plurality of members of the remotely located audience and the controller is configured to temporally aggregate the received feedback, i.e., accumulate the feedback over time.

According to an embodiment, the digital feed provided by the communications interface of the system includes at least one of video and audio. In yet another embodiment, the digital feed from the performance area is a video feed of the performance area. Similarly, according to an embodiment, the digital feed from the performance area is a video feed of an event at the performance area. In another embodiment, the digital feed from the performance area is an audio feed of the performance area. In an alternative embodiment, the digital feed from the performance area includes biometric data regarding at least one person at the performance area. In such an embodiment, the biometric data may include any biometric data known in the art, including at least one of: heart rate, respiration, and temperature.

In an embodiment of the system, the remotely located audience comprises a plurality of members and the communications interface is configured to provide the digital feed to each member of the remotely located audience. Likewise, according to another embodiment, the remotely located audience comprises a plurality of members and the communications interface is configured to receive feedback from each of the plurality of members of the remotely located audience. In yet another embodiment, the remotely located audience comprises a plurality of audience members and two or more of the plurality of audience members are at a same geographic location.

According to yet another embodiment, the communications interface is further configured to receive local feedback from an audience located local to the performance area. In such an embodiment, the controller may be configured to provide output at the performance area at a time that is determined based on when the communications interface receives the local feedback. In such an embodiment, the controller can be configured to determine the time to provide output at the performance area. In yet another embodiment, the output at the performance area provided by the controller is based on at least one of: a number of remotely located audience members, a past feedback, an event type, an event gravity, a current score of an event, a completion percentage of an event, a local feedback, and a likelihood of an event.

An alternative embodiment of the system further comprises at least one display proximally located to the performance area where the at least one display is configured to depict a representation of at least a portion of the remotely located audience. According to an embodiment, the representation is at least one digital avatar that corresponds to the portion of the remotely located audience. In yet another embodiment, the at least one display is configured to depict a plurality of digital avatars and highlight one or more of the depicted plurality of avatars based on received feedback associated with one or more highlighted avatars. In an embodiment, the at least one display is configured to depict a number of digital avatars that is proportional to the number of members in the remotely located audience. Moreover, in another embodiment, the at least one display is configured to depict a number of digital avatars that is set by a user to simulate an audience of a desired size. In yet another embodiment, at least a portion of the at least one display is observable from the performance area. In an embodiment, at least a portion of the at least one display is alongside the performance area.

Further still, in yet another embodiment, at least one display proximally located to the performance area is configured to depict at least one digital avatar at a position selected by a member of the remotely located audience. According to another embodiment, the at least one display is configured to depict at least one digital avatar with a sign. Further, in an embodiment, the at least one display is configured to customize the depicted at least one digital avatar based on input from the remotely located audience. Further, in an embodiment, the at least one display is configured to animate the at least one digital avatar to render the feedback received from the remotely located audience or to render feedback predicted to be received from the remotely located audience. According to another embodiment, the remotely located audience comprises a plurality of members, and, in such an embodiment, the at least one display is configured to depict an avatar for each of the plurality of members of the remotely located audience.

Another embodiment of the system further comprises one or more sensors configured to detect one or more events at the performance area. In such an embodiment, the sensors may include any such sensors known in the art, such as: a camera, a motion detector, a heat camera, an accelerometer, and a microphone. An embodiment of the system that includes the sensors is configured to animate at least one digital avatar depicted on a display based on one or more events detected at the performance area by the one or more sensors. In yet another embodiment, the at least one display is configured to calculate a focal score for each of the one or more events detected by the one or more sensors and animate a selected avatar using a probabilistic determination and the calculated focal score for each of the one or more events. In such an embodiment, the at least one display may be configured to calculate the focal score for each of the one or more events based on at least one of: event location, event magnitude, sound location, and motion location. Similarly, in an embodiment animation of the avatar may be based upon at least one of: focal score, avatar attention span, event location, sound location, and motion location.

In an alternative embodiment, the communications interface is further configured to provide to a remotely located audience an image that corresponds to an avatar that appears, appeared, or will appear on at least one display. In yet another embodiment, the at least one display is configured to provide a three-dimensional (3D) rendering of the representation depicted on the display. Further, according to another embodiment, the at least one display is configured to provide a virtual presence of the remotely located audience. In yet another embodiment, the at least one display is provided by a projector.

Another embodiment of the system provides digital "takeaways" for members of the remotely located audience. In one such embodiment, the controller is configured to create a digital rendering of a physical object from the performance area and the communications interface is configured to provide the digital rendering created by the controller to the remotely located audience. In yet another embodiment, the controller is further configured to provide a physical avatar corresponding to at least a portion of the remotely located audience.

Another embodiment of the present invention is directed to a method for creating a virtual audience. Such a method embodiment provides a digital feed from a performance area to a remotely located audience, receives feedback from the remotely located audience, and provides an output at the performance area corresponding to at least a portion of the received feedback. Embodiments of such a method may perform the functions of any of the system embodiments described herein.

Yet another embodiment of the present invention is directed to a method of facilitating remote audience participation. Facilitating remote audience participation in such a method includes receiving a digital feed from a performance area at a device associated with a user and, in turn, sending feedback to the performance area and receiving output from the performance area corresponding to feedback from a plurality of remotely located audience members. Such a method may also include enabling communication among a plurality of remotely located audience members.

In an embodiment of the invention that facilitates remote audience participation, the feedback sent to the performance area may be a signal from an accelerometer coupled to the device associated with the user. In yet another embodiment, the feedback sent to the performance area is selected from a feedback listing. According to an embodiment, the feedback listing includes at least one of: clapping, stomping, booing, a spoken statement, a physical change to the performance area, and text. An alternative embodiment further comprises receiving feedback from the performance area regarding a digital avatar depicted in the performance area. Yet another embodiment further includes receiving a digital rendering of a physical object that is in the performance area.

Another embodiment for facilitating remote audience participation comprises displaying data related to a performance area in a plurality of panels of a graphical user interface on a device associated with a user. In a particular embodiment, a first panel depicts the output received from the performance area, a second panel depicts a digital feed, and a third panel depicts an avatar associated with the user. In another embodiment, one of the panels further depicts event scores. In yet another embodiment, the output from the performance area depicted in the first panel illustrates a plurality of digital avatars corresponding to a plurality of remotely located audience members.

Another embodiment is capable of highlighting a particular user. In such an embodiment, a user receives a notification that the user is being featured, the user sends an expression in response to the notification, and, in a panel, an avatar associated with the user is depicted performing the sent expression among a plurality of digital avatars that correspond to a plurality of remotely located audience members.

Another embodiment is directed to a system for generating a virtual audience. Such a system comprises a capture device configured to capture a digital feed from a performance area and communicate the digital feed to a remotely located audience. Further, the system comprises an emitter device configured to provide an output perceptible at the performance area, and the output can correspond to feedback received from the remotely located audience.

Another system embodiment generates a virtual audience through use of a communications interface configured to: provide a digital feed from a performance area to a remotely located audience, receive feedback from the remotely located audience, and provide an audience output to at least one member of the remotely located audience. Such a system embodiment may further comprise a controller configured to determine the audience output based on the received feedback. In a further embodiment, the remotely located audience comprises a plurality of members and the communications interface is further configured to receive feedback from multiple members of the remotely located audience. In yet another embodiment, the controller is further configured to aggregate the feedback received from the multiple members of the remotely located audience and determine the audience output based on the aggregated feedback. In such an embodiment, the controller may be configured to temporally aggregate the feedback received from the multiple members of the remotely located audience.

Yet another embodiment directed to a system for generating a virtual audience comprises a communications interface configured to provide a digital feed from a performance area to an audience and receive feedback from the audience. Further, the system includes a controller configured to provide an output at the performance area corresponding to at least a portion of the received feedback. According to an embodiment, the audience includes a remotely located audience and an audience located local to the performance area. In a further embodiment, the received feedback includes feedback from both the remotely located audience and the locally located audience. In one such embodiment, the controller is configured to provide the output at the performance area at a time determined based on low latency feedback from the received feedback. Likewise, in yet another embodiment, the controller is configured to determine the output, e.g., type and magnitude, at the performance area based on low latency feedback from the received feedback. In such an embodiment, the controller may be configured to determine the output at the performance area based on at least one of: a number of audience members, past feedback, an event type, an event gravity/importance, a current score of an event, a completion percentage of an event, and a likelihood of an event.

Another embodiment is directed to a system that comprises a communications interface and a controller. The communications interface in such a system is configured to receive feedback related to a performance area from a remotely located audience and receive feedback from an audience located locally to the performance area. The controller is configured to provide an output at the performance area corresponding to at least a portion of the received feedback. In such an embodiment, the controller may be further configured to provide the output at the performance area at a time determined based on low latency feedback from among the feedback received from at least one of the remotely located audience and the locally located audience. Further, in yet another embodiment, the controller is configured to determine the output at the performance area based on at least one of: a number of audience members, past feedback, an event type, an event gravity, a current score of an event, a completion percentage of an event, and a likelihood of an event.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

The teachings of all patents, published applications and references cited herein are incorporated by reference in their entirety.

Figure 1:
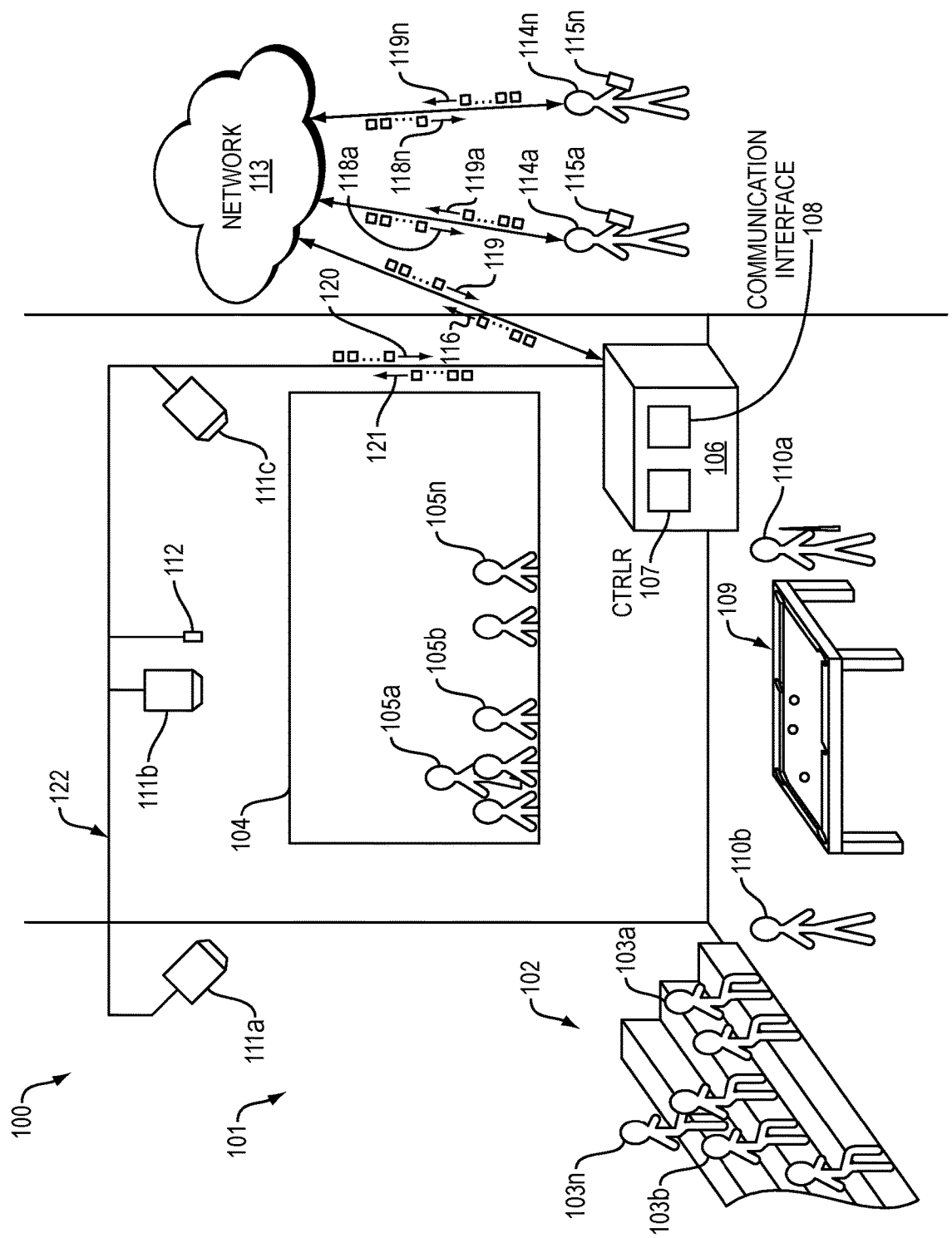
FIG. 1 is a simplified illustration of an environment in which an embodiment of the present invention may be implemented.

FIG. 1 is a simplified illustration of a system 100 that includes a performance area 101 in which an embodiment of the present invention may be implemented. In the performance area 101, the players 110a and 110b are playing a billiard game on the table 109 and the game play is being viewed by the live audience 102, which includes the live audience members 103a-n. The performance area 101 also includes a computing device 106 that includes a controller 107 and communication interface 108.

The computing device 106 is configured to collect data 120, via the interconnect 122, from input devices such as the cameras 111a-c and microphone 112. The computing device 106 is also configured to send control commands 121 to the various input devices 111a-c and 112. Further, the computing device 106 processes the collected data with the controller 107 and provides the processed data 116 via the communications interface 108 and network 113 to the remote audience members 114a-n. The remote audience members 114a-n receive the performance area data 118a-n on respective computing devices 115a-n. The remote audience members 114a-n may also provide feedback 119a-n, collectively 119, via the network 113, to the computing device 106. The computing device 106 along with the controller 107 are configured to process the feedback data 119 along with data collected from the live audience 102 to provide the virtual audience via the display 104 that includes the avatars 105a-n.

It is noted that the network 113 may be any network, including any variety and combination of wired and wireless networks, known in the art. Likewise, the computing device 106 may be any computing device, such as a server, known in the art. Further, while the controller 107 and communication interface 108 are depicted as separate components, they may be implemented via any combination of hardware and software elements as is known in the art. Further, the computing device 106 and/or controller 107 may be coupled to or components of the systems described in the related applications, U.S. Provisional Application No. 62/619,353 entitled "ENHANCED BILLIARD TABLE SYSTEMS AND METHODS" by Ira Lee, filed on Jan. 19, 2018 and U.S. Provisional Application No. 62/671,578 entitled "ENHANCED GAMING SYSTEMS AND METHODS" by Ira Lee, filed on May 15, 2018. Furthermore, embodiments of the invention are not limited to locating the computing device 106 at the performance area 101, and the computing device 106 can be located anywhere so long as the computing device can receive and process the data as described herein. Moreover, the computing device may be implemented via any combination of local and cloud processing. Likewise, while data is transferred via the interconnect 122 and network 113, the system 100 may transfer data between the various components, e.g., cameras 111a-c, computing device 106, and devices 115a-n, via any communication method known in the art. Similarly, the display 104 may be any display known in the art. For example, in an embodiment, the display 104 may be provided by a projector.

In an example embodiment, the computing device 106 along with the controller 107 and communications interface 108 are configured to provide a virtual audience. In such an example embodiment, the players 110b and 110a play a billiards game on table 109 and cameras 111a-c and microphone 112 collect data, e.g., video and sound data of the gameplay, and transfer the collected data 120 to the computing device 106. The controller 107 processes the collected data 120 to create a digital feed 116 and the computing device 106 provides the digital feed 116 via the communications interface 108 and network 113 to the remotely located audience members 114a-n. The remotely located audience members 114a-n receive a digital feed signal 118a-n at their respective computing devices 115a-n. In response to the received digital feeds 118a-n, the audience members 114a-n can provide feedback 119a-n, e.g., clapping, via the computing devices 115a-n. The feedback 119 is received at the computing device 106 via the network 113 and communication interface 108. The controller 107 processes the feedback 119 and provides an output at the performance area 101 corresponding to at least a portion of the received feedback 119. Moreover, in an embodiment, the controller 107 may provide feedback in the performance area 101 in accordance with the method 300 described hereinbelow in relation to FIG. 3. In an embodiment, the output at the performance area may be a rendering of the feedback on the display 104 where the rendering displays the avatars 105a-n. In this way, the system 100 may be configured to implement any embodiments or combinations of embodiments of the present invention described herein.

While the performance area 101 depicts a billiard game being played by the players 110a and 110b on the table 109, the performance area 100 may be any performance area, i.e., area where an event takes place, known in the art. For example, the performance area 101 can be an arena, a billiard table, a stage, a training facility, or a school, among other examples. Further, while a particular network of sensors, e.g., the cameras 111a-c and microphone 112, is illustrated, it should be clear to one of skill in the art that any variety of input devices, i.e., sensors, may be used and networked in any variety of configurations. For example, sensors may include one or more of a camera, a microphone, a motion detector, a heat camera, and an accelerometer. Moreover, the network of sensors may include any data sensing devices described in the related applications U.S. Provisional Application No. 62/619,353 entitled "ENHANCED BILLIARD TABLE SYSTEMS AND METHODS" by Ira Lee, filed on Jan. 19, 2018 and U.S. Provisional Application No. 62/671,578 entitled "ENHANCED GAMING SYSTEMS AND METHODS" by Ira Lee, filed on May 15, 2018.

Further, it is noted that while two remotely located audience members 114a and 114n are depicted, the remotely located audience may comprise any number of groups of remotely located audience members and these groups may comprise any number of people. Further, members of the remotely located audience may include multiple members each at separate geographic locations. For example, the remotely located audience may include a group of people at a viewing party and another member of the remotely located audience may be an individual watching the performance at home. In such embodiments, the communications interface 108 is configured to receive feedback 119 from each of the plurality of remotely located audiences. In an embodiment where the communications interface 108 is configured to receive feedback 119 from each of the plurality of members of the remotely located audience, the communications interface 108 may likewise be configured to provide the digital feed 116 to each member of the remotely located audience.

According to an embodiment, the feedback 119 received at the communications interface 108 may be any feedback known in the art. In an embodiment, the feedback may include at least one of: clapping, stomping, booing, a spoken statement, and text. Moreover, in an embodiment where the feedback includes voice feedback, the controller 107 can be configured to remove language, such as offensive language, from the received voice feedback. In embodiments, the offensive language may be removed using a text filter, crowd sourcing, or any other method known in the art. In another embodiment of the system 100, the controller 107 is configured to remove one or more inappropriate response from the received feedback. For example, in an embodiment, the controller 107 removes inappropriate language from text feedback. In yet another embodiment, the communications interface 108 is further configured to provide the remotely located audience 114a-n with a listing of feedback options corresponding to the feedback the communications interface 108 is configured to receive. In such an embodiment, the feedback 119 received by the communications interface 108 comprises at least one feedback from the provided listing of feedback options. To illustrate, the communications interface 108 may provide commands to display the listing of available feedback options in a graphical user interface of an application or internet browser running on the computing devices 115a-n associated with the remotely located audience members 114a-n. In turn, a particular audience member 114a may select an option, e.g., a thumbs down, on the computing device 115a and this option results in feedback 119a, which is communicated to the communications interface 108.

In yet another embodiment, the feedback 119 received by the communications interface comprises a signal representing motion of an electronic device 115a-n of at least one member 114a-n of the remotely located audience. According to such an embodiment, the signal representing motion of the electronic device represents at least one of: contact between a member of the remotely located audience and his or her associated electronic device and movement of the electronic device. For example, according to an embodiment, the audience member 114a may tap on his or her electronic device 115a and an accelerometer in the device 115a may sense this tapping and provide the sensed motion as the feedback 119a. Likewise, the audience member 114a may move his or her phone to express his or her feedback and, again, an accelerometer in the device 115a can sense this motion and provide a signal representing the motion as the feedback 119a.

According to an embodiment, the system 100 may operate in real-time. For example, the communications interface 108 can be configured to receive the feedback 119 in real-time and the controller 107 can be configured to provide the output at the performance area in real-time. Further, in another embodiment, the controller 107 can be configured to provide the output at the performance area 101 at a time determined based on when the communications interface 108 receives local feedback from the audience 102. According to an embodiment of the system 100, the timing of receiving the feedback 119 and of providing the output at the performance area 101 may be performed according to the methods and timing described hereinbelow in relation to FIG. 3.

In another embodiment, where the digital feed 116 is a broadcast of an event at the performance area 101, the communications interface 108 can be configured to provide the digital feed 116 after a time at which the event occurred and, likewise, receive the feedback 119 after the time at which the event occurred. Such an embodiment of the system 100 provides enhanced delayed viewing of the event. For example, in such an embodiment, the communication interface 108 is configured to receive feedback over time, e.g., receive the feedback whenever it is provided by the remotely located audience members who provide the feedback when they receive the digital feed, after the event occurs. Further, the controller 107 is configured to aggregate the feedback that is received over time, i.e., temporally aggregate the received feedback.

In such an embodiment, the controller 107 is further configured to determine an audience output that reflects the feedback that has been aggregated up to the point in time that each audience member 114a-n receives his or her respective digital feed 118a-n. To illustrate, in an example embodiment the event at the performance area 101 occurs on January $1^{st}$ and, over the next month, 50,000 remotely located individuals watch a digital feed of the performance and they provide feedback, such as clapping. Then, on February $1^{st}$, an individual remotely located audience member watches a digital feed of the performance and he or she receives an audience output reflecting the applause from the 50,000 people who had previously provided feedback. In turn, throughout February another 50,000 individuals watch the digital feed and provide clapping feedback. Similarly, on March $1^{st}$, another remotely located audience member watches the digital feed and he or she receives an audience output reflecting the applause from the 100,000 people who had previously provided feedback.

As described hereinabove, the controller 107 can be configured to provide an audience output to the remotely located audience. The audience output can take any form that can be communicated via the system 100. For example, the audience output may include text, video, and/or audio. According to another embodiment, the communications interface 108 is likewise configured to provide to the remotely located audience an image that corresponds to an avatar that appears, appeared, or will appear on the display 104. In an embodiment, the controller 107 determines an audience output to be provided to a subset of the remotely located audience, e.g., an individual member of the audience or a group of remotely located audience members. Likewise, in such an embodiment, the communications interface 108 is configured to provide the determined audience output to the subset of the remotely located audience. Further, in such an embodiment, the controller 107 is configured to determine which members of the remotely located audience receive the audience output. In an embodiment, the controller 107 is configured to use feedback from members of the remotely located audience, other than the subset of the remotely located audience, to determine the audience output. In other words, in such an embodiment, the controller 107 may use feedback from one audience member to determine the audience output for another audience member.

According to an embodiment, the audience output determined by the controller 107 includes aggregated feedback that is generated by the controller 107 from feedback received at the communications interface 108 from multiple members of the remotely located audience. Further, in yet another embodiment, the aggregated feedback may also include feedback received from members 103a-n of the local audience 102 at the communications interface 108. In an embodiment, the local audience 102 may provide feedback via electronic devices (not shown) in the same or a similar manner as the remotely located audience and this local feedback may be received at the communications interface 108. Alternatively, local feedback may be collected by sensors, e.g., cameras 111a-c and microphone 112 in the performance area 101, and be received at the communications interface 108.

In an embodiment, the controller 107 is configured to synthesize the feedback 119, received by the communications interface 108 from the remotely located audience members 114a-n, with additional aggregated feedback to determine the audience output. For example, this synthesis may include creating a signal that reflects the collective feedback received over time. In this way, for example, feedback, such as clapping from 50,000 people that was received at different times, may be combined and provided as audience output in a way so that the audience output sounds like 50,000 people clapping at once. In embodiments, the feedback may be combined using an audio processing platform or any other method known in the art for sound processing.

The controller 107 may also be configured to police the audience via the audience output. For example, in an embodiment, the controller 107 determines an audience output to use that informs a member of the remotely located audience, e.g., the audience member 114a, of impropriety of the received feedback 119a. In this way, if, for example, the feedback 119a includes inappropriate language, the controller 107 may determine an audience member output that is then provided via the communications interface 108 and network 113 to the audience member 114a to indicate that the inappropriate language is not acceptable, and, if such behavior persists, the audience member 114a will no longer be able to receive the digital feed 116 or provide feedback 119a. Further, according to an embodiment, the communications interface 108 is configured to ban a member of the remotely located audience 114a-n based on an internet protocol address associated with the banned audience member.

In yet another embodiment of the system 100, the audience output includes data metrics regarding at least one of: members of the remotely located audience 114a-n, the performance area 101, an event at the performance area, and received feedback 119. These data metrics may indicate, for example, the number of audience members, a score of an event, difficulty of the performance, likelihood of outcome or percentages of feedback types. Moreover, in an embodiment, the audience output may include any data that is observable by the systems described in the applications, U.S. Provisional Application No. 62/619,353 entitled "ENHANCED BILLIARD TABLE SYSTEMS AND METHODS" by Ira Lee, filed on Jan. 19, 2018 and U.S. Provisional Application No. 62/671,578 entitled "ENHANCED GAMING SYSTEMS AND METHODS" by Ira Lee, filed on May 15, 2018. Moreover, in an embodiment, the communications interface 108 is configured to provide a graphical representation of audience participation to at least one member of the remotely located audience.

In an alternative embodiment of the system 100, the controller 107 is configured to create a digital rendering of a physical object from the performance area 101 and the communications interface 108 is further configured to provide the created digital rendering to the remote audience members 114a-n. In an embodiment, this may include, for example, scanning a score sheet and providing the scanned version of the score sheet to the remotely located audience 114a-n Embodiments of the system 100 provide a feed 116 from the performance area to the remotely located audience members 114a-n via the network 113. The feed 116 may be any feed known in the art. For example, the feed 116 may include audio, video, text, and any combination thereof. Moreover, in an embodiment, the feed 116 may include any data that is observable by the systems described in the applications, U.S. Provisional Application No. 62/619,353 entitled "ENHANCED BILLIARD TABLE SYSTEMS AND METHODS" by Ira Lee, filed on Jan. 19, 2018 and U.S. Provisional Application No. 62/671,578 entitled "ENHANCED GAMING SYSTEMS AND METHODS" by Ira Lee, filed on May 15, 2018, the entire teachings of which are incorporated herein by reference. In addition, in an embodiment, the digital feed 116 from the performance area 101 is a video feed of the performance area 101 or an event at the performance area 101. In addition, in yet another embodiment of the system 100, the digital feed 116 from the performance area 101 includes biometric data regarding at least one person at the performance area, e.g., the player 110a. The biometric data may include any biological data known in the art, such as heart rate, respiration, and temperature.

Further, according to an embodiment, the communications interface 108 is configured to provide a custom feed 116 to a member of the audience. The custom feed 116 may be any custom information. For example, the custom feed may be feedback that is a function of feedback provided by other audience members who have avatars depicted near an avatar associated with the remote audience member, a warning, etc. Similarly, in another embodiment, the custom feed may be a combination of the feedback provided by the user along with the feedback of the local and/or other remote audience members. Such a custom feed provides the experience of being live at an event and hearing your feedback amongst the feedback of other audience members. Moreover, in an embodiment, the custom feed may include the feedback of other audience members that have been selected. In this way, the custom feed can provide the experience of hearing feedback provided by other chosen audience members. Moreover, in an embodiment, the feed 116 may include any data that is observable by the systems described in the applications, U.S. Provisional Application No. 62/619,353 entitled "ENHANCED BILLIARD TABLE SYSTEMS AND METHODS" by Ira Lee, filed on Jan. 19, 2018 and U.S. Provisional Application No. 62/671,578 entitled "ENHANCED GAMING SYSTEMS AND METHODS" by Ira Lee, filed on May 15, 2018.

According to an embodiment, the controller 107 is configured to aggregate the feedback 119 received by the communications interface 108 from each of the plurality of remotely located audience members 114a-n. In such an embodiment, aggregating the feedback may include creating data that reflects an accumulation of the feedback 119a-n from each member of the remotely located audience 114a-n. This aggregated feedback, when rendered at the performance area 101, provides an indication of the feedback 119 as if the members of the remotely located audience 114a-n were located at the performance area 101. Thus, in an embodiment, the output provided by the controller 107 at the performance area 101 is based on the aggregated feedback. According to an embodiment, the controller 107 is configured to utilize the frequency that a particular feedback type occurs in the aggregated feedback to provide the output at the performance area 101. For instance, if feedback is received from 100 people and the feedback is 90% positive and 10% negative, the output at the performance area 101 provided by the controller 107 may reflect the nature and frequency of the feedback.

In yet another embodiment, the output provided by the controller 107 at the performance area 101 is enhanced. In other words, the output at performance area 101 is an enhanced, e.g., increased, rendering of the feedback 119 that is received. For example, according to an embodiment, the output provided by the controller at the performance area is based on a user selected artificial audience size. To illustrate, if feedback 119 is received from 10 members of the remotely located audience, and a user selects a ten-fold enhancement, the output at the performance area provided by the controller may make it appear as if feedback had been received from 100 people. The user, for example, could select a 100 member audience. Thus, rather than the feedback at the performance area sounding like 10 people clapping, the output may sound as if 100 people were clapping. In this way, the controller 107 employs the user selected audience size to adjust the received feedback to correspond to the user selected audience size in providing the output at the performance area 101.

According to yet another embodiment of the system 100, the controller 107 is configured to provide the output at the performance area 101 based on an event in the performance area 101. This may include the controller 107 modifying one or more of the timing, type, and magnitude of the feedback at the performance area 101 based on an event at the performance area 101. For example, if the performance area is a golf tee box, the controller 107 can be configured so that it does not provide output at the tee box when a golfer is preparing to swing, but may provide the feedback once the golfer is done swinging. Thus, in an embodiment, the controller 107, in providing the output at the performance area based on an event in the performance area, is configured to delay providing the output as a result of a component of the event in the performance area, e.g., the golfer preparing to swing and then swinging the golf club. These components of the event may be determined as described in the related applications, U.S. Provisional Application No. 62/619,353 entitled "ENHANCED BILLIARD TABLE SYSTEMS AND METHODS" by Ira Lee, filed on Jan. 19, 2018 and/or U.S. Provisional Application No. 62/671,578 entitled "ENHANCED GAMING SYSTEMS AND METHODS" by Ira Lee, filed on May 15, 2018.

According to an embodiment, the controller 107 can be configured to use a simulation of an event at the performance area 101 to provide the output at the performance area as a result of a component of the event in the performance area 101. In such an embodiment, the simulation may be a finite element simulation that analyzes the status of the event at the performance area and, using physics based models, predicts upcoming events. These predicted events can then be used by the controller 107 in providing the output at the performance area. To illustrate, returning to the aforementioned golf example, the simulation may receive data from sensors at the performance area and determine that, based upon the position of the golfer, he will be swinging soon, and, as a result, the controller 107, in response to this predicted event, may delay providing output at the performance area.

The output provided at the performance area 101 by the controller 107 may be any such output known in the art. For example, the output at the performance area 101 may include at least one of: sound, video, text, motion, scent, and an aggregated and collective rendering of the received feedback 119. In addition, according to an embodiment, the output provided by the controller 107 is perceptible at the performance area 101. According to an embodiment of the system 100, the output may be visual via the display 104 or may be audible and provided via a speaker. In another embodiment, the controller 107 is configured to provide the output via at least one avatar. In yet another embodiment, the output provided by the controller 107 at the performance area comprises at least one physical change to the performance area 101. In such an embodiment, the at least one physical change is effected through at least one of: a streamer, a fan, confetti, a motor, an actuator, a robot, a light, a fog machine, and a speaker. According to yet another embodiment, the output at the performance area 101 provided by the controller 107 is based on at least one of: a number of remotely located audience members, a number of local audience members, a total number of audience members, past feedback, an event type, an event gravity, a current score of an event, a completion percentage of an event, local feedback, and a likelihood of an event. Thus, the output provided by the controller 107 at the performance area 101 may take into account any number of factors. For example, if, in the system 100, a billiard shot is particularly difficult, the feedback may be magnified when a player makes the shot. According to embodiments, the output may be provided by the controller 107 directly or indirectly. For instance, in an embodiment, as an example of the controller 107 indirectly providing the output, the controller 107 may interface with one or more output devices, such as a speaker or display. In another embodiment, the output at the performance area is provided in accordance with the method 300 described hereinbelow in relation to FIG. 3. In such an embodiment the output at the performance area 101 includes local reaction data and predicted remote reaction data as described in FIG. 3.

According to another embodiment of the system 100, the controller 107 is configured to provide the output at the performance area based on a theme selected from a plurality of themes. The themes may reflect an overall aesthetic that is trying to be achieved. For example, if the event is generally more quiet and subdued, e.g., a spelling bee, a "quiet" theme may be selected. Conversely, if the event is a more raucous event, such as a professional wrestling match, a "loud" theme may be selected. Thus, in embodiments, themes can be based upon the type of event. Further, in such an embodiment, the theme may be determined by a proportion, e.g., a majority, of members of the remotely located audience or may be determined by a system administrator. In another embodiment, a theme may be automatically determined based upon data of the environment and received feedback. Further still, in an embodiment, the theme may automatically be changed and modified to correspond to changes in the environment that are detected by sensors.

As illustrated in FIG. 1, the system 100 includes the display 104. In the system 100, the display 104 is located proximal to the performance area 101. In the system 100 the display is observable from the performance area 101 and can be positioned alongside the performance area 101. Further, in another embodiment, the display 104 is configured to depict a representation of at least a portion of the remotely located audience. In one such example embodiment, the display 104 is configured to provide a three-dimensional (3D) rendering of the representation. In an embodiment, the display 104 is configured to provide a virtual presence of the remotely located audience 104. According to an embodiment, the depictions on the display 104 are controlled by the computing device 106. For instance, in an embodiment, the controller 107 may determine what is depicted on the display 104 and what is determined can, in turn, be rendered on the display 104, according to principles known in the art. For instance, in such an embodiment, the controller 107 automatically determines what to depict on the display based upon event and environmental data which includes any data that can be observable in the performance area 101. This event and environmental data may include any data that is observable by the systems described in the applications, U.S. Provisional Application No. 62/619,353 entitled "ENHANCED BILLIARD TABLE SYSTEMS AND METHODS" by Ira Lee, filed on Jan. 19, 2018 and U.S. Provisional Application No. 62/671,578 entitled "ENHANCED GAMING SYSTEMS AND METHODS" by Ira Lee, filed on May 15, 2018. According to another embodiment, what is depicted on the display 104 is governed by a reaction controller as described hereinbelow in relation to FIG. 13.

According to an embodiment of the system 100, the depicted representation of the remotely located audience appearing on the display 104 is the digital avatars 105a-n. In an embodiment, the display 104 is further configured to highlight one or more of the depicted plurality of digital avatars 105a-n based on received feedback associated with one or more highlighted avatars. For instance, in an embodiment, the display may highlight an avatar that is dancing in response to an instruction or feedback from a remotely located audience member that is associated with the highlighted/dancing avatar.

As described herein, the display 104 can be configured to display a plurality of digital avatars. In such an embodiment, the display 104 can be configured to depict a number of digital avatars that is proportional to the number of members in the remotely located audience 114a-n. For example, in such an embodiment, the display 104 may display a digital avatar for every member of the remotely located audience, or may display one digital avatar for every two members of the remotely located audience. In an embodiment, the number of digital avatars to display is determined by the controller 107.

In yet another embodiment, the display 104 is configured to depict an avatar at a position selected by a member of the remotely located audience. In such an embodiment, a remotely located audience member, e.g., the audience member 114a, may indicate that he or she wants his or her digital avatar to be depicted in the first row of avatars rendered on the display 104 and, in turn, his or her avatar would be depicted in the first row. Another embodiment may include functionality to determine prioritization between conflicting avatar location requests. In such an embodiment, prioritization may be determined randomly based on any number of factors such as viewing time and payment. In another embodiment, the display 104 is configured to depict a digital avatar with a sign. In such an embodiment, the sign may include text to express a remote audience member's feedback. Further, in yet another embodiment of the system 100, the display 104 is configured to customize the depicted avatar based on input from the remotely located audience. Further, in addition to depicting an avatar 105a-n, the display 104, according to an embodiment, is configured to animate a digital avatar 105a-n to render feedback 119 received from the remotely located audience 114a-n. Likewise, in another embodiment, the display 104 is configured to animate the at least one digital avatar based on an event detected at the performance area 101 by sensors, e.g., cameras 111a-c and microphone 112. Specifically, in an embodiment, the display 104 is configured to animate head and eye movement of the avatars 105a-n based on events detected at the performance area. In such an embodiment, data from the sensors is used to control movement, e.g., head and eye movement, of avatars. According to an embodiment, at least one of the display 104 and controller 107 is configured to calculate a focal score for each event detected by the sensors 111a-c and microphone 112 and, in turn, the display is configured to animate each avatar 105a-n using a probabilistic determination and the calculated focal score for the event. In such an embodiment, the focal score may be based upon any data that is observable by the systems described in the applications, U.S. Provisional Application No. 62/619, 353 entitled "ENHANCED BILLIARD TABLE SYSTEMS AND METHODS" by Ira Lee, filed on Jan. 19, 2018 and U.S. Provisional Application No. 62/671,578 entitled "ENHANCED GAMING SYSTEMS AND METHODS" by Ira Lee, filed on May 15, 2018. In such an embodiment, the focal scores are calculated for each event. According to an embodiment, focal scores are determined according to the method 440 described hereinbelow in relation to FIG. 4. In turn, avatar animations are controlled based on a weighted probability of the focal scores.

To illustrate, if, for example, there are two events with respective focal scores of 10 and 5, the probabilistic determination, which is a weighted determination, results in depicting approximately two thirds of the avatars focusing on the event with a focal score of 10 and depicting one third of the avatars focusing on the event with a focal score of 5. The animation of avatars may also be modified based on respective avatar attention spans. The respective attention spans may be used to determine how long each avatar observes each event. In embodiments, avatar attention span may be set randomly or may be based on configurable parameters set by a user. Attention span may be varied depending on the event type or a theme of the event that the user wants to convey.

Further still, avatar animation may be modified based on at least one of: event location, sound location, and motion location. For instance, if a given avatar is depicted on a portion of the display 104, a modification can be made to the avatar's animation control to make it more likely that the avatar will look at the closer event. To illustrate, if there are two events each with a focal score of 5, an avatar would have a 50/50 chance of focusing on either event. However, if for example one of the events was geographically closer to where the avatar is depicted on the display, the probability determination used to determine the avatar's animation may be modified so that there is a 75% chance that the avatar will focus on the closer event. Further still, avatar animation in the system 100 may be as described hereinbelow in relation to FIG. 4 and FIG. 5.

In addition to controlling avatar animation, the controller 107 is also configured to control avatar sounds. In such an embodiment, the controller 107 determines avatar sounds based on environment data. Moreover, avatar animation and sound control may also include automated murmuring, conversations, and gestures. The automated murmuring, conversations, and gestures may be used to animate the avatars during event downtime. Thus, rather than being completely still and silent, the avatars move and provide noise similarly to a live audience during periods of inactivity in the event at the performance area. Moreover, in an embodiment, these automated animations may be driven by what is detected to be occurring in the performance area.

In an alternative embodiment, the controller 107 is further configured to provide and/or control a physical avatar corresponding to at least a portion of the remotely located audience.

Figure 2:
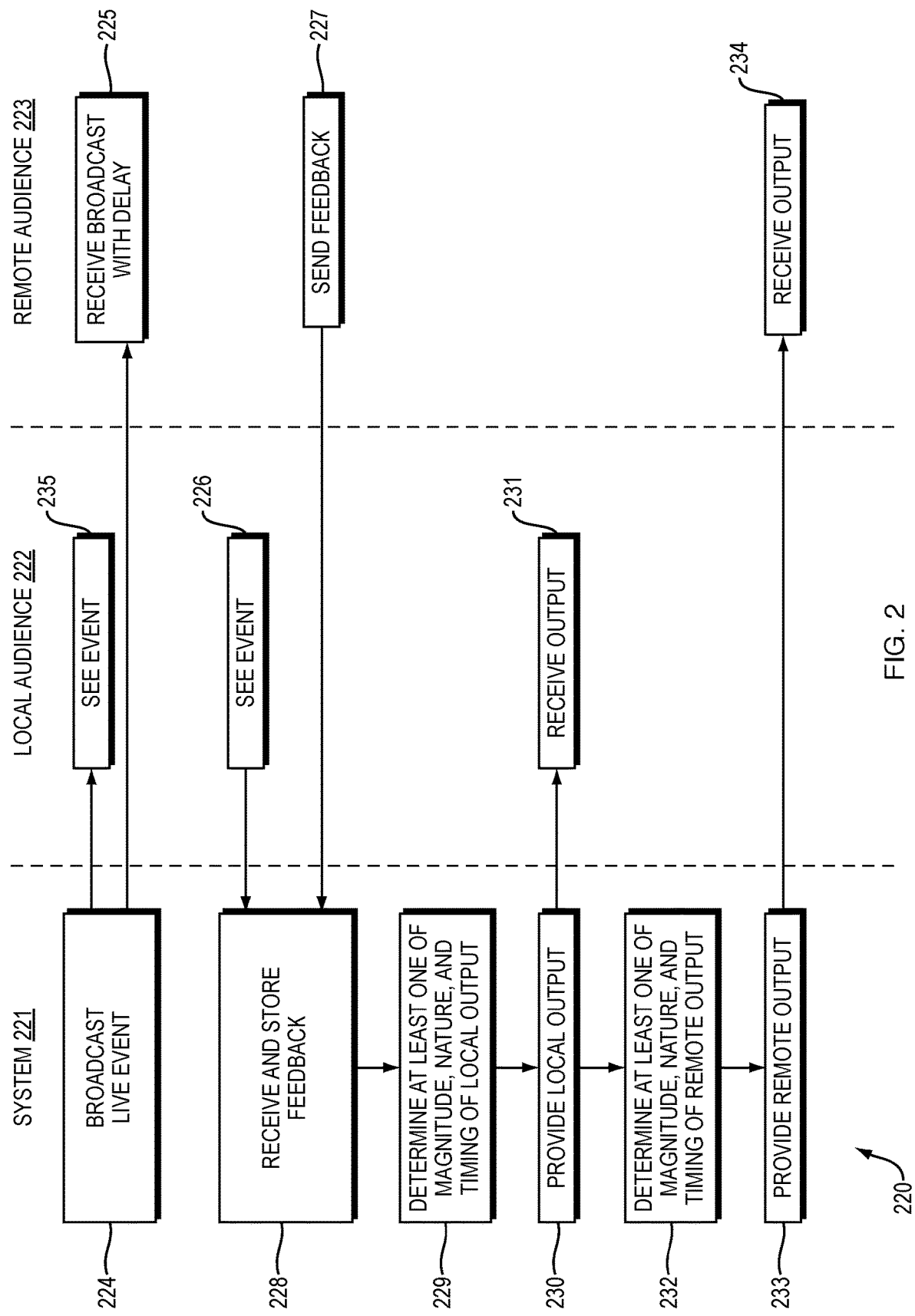
FIG. 2 is a flow diagram illustrating a method for creating a virtual audience according to an embodiment.

FIG. 2 is a flow diagram of a method 220 for creating a virtual audience according to an embodiment. In the method 220, various actions are taken by system 221, local audience 222, and remote audience 223. The system 221 may be implemented by any computing device known in the art that can be configured through any combination of hardware and software to implement the method 220. For example, the system 221 may be implemented using one or more systems described in the related applications U.S. Provisional Application No. 62/619,353 entitled "ENHANCED BILLIARD TABLE SYSTEMS AND METHODS" by Ira Lee, filed on Jan. 19, 2018 and U.S. Provisional Application No. 62/671, 578 entitled "ENHANCED GAMING SYSTEMS AND METHODS" by Ira Lee, filed on May 15, 2018. The local audience 222 is an audience of live people located at a performance area and the remote audience 223 is any number of people alone or in groups that are not located at the performance area. The actions of the local audience 222 may be implemented via electronic devices associated with the members of the local audience or devices, such as sensors and output devices, located at the performance area or a combination thereof. Similarly, the actions of the remote audience 223 may be facilitated via electronic devices associated with the remote audience members or sensors and output devices at the remote audience member locations or a combination thereof.

The method 220 begins with an event taking place and being seen by the local audience 222 at step 235 and the system 221, at step 224, broadcasting the live event, which is received, with a delay at step 225, by the remote audience 223. The broadcast may be any broadcast known in the art, e.g., a video or audio broadcast. Further, the delay with which the broadcast is received at step 225 may be a conventional delay that is caused by the communication speed restrictions of broadcast or any combination of a delay introduced by the system 221. At step 226, the local audience 222 sends feedback to the system 221 and, similarly, at step 227, the remote audience 223 sends feedback to the system 221. The feedback sent at steps 226 and 227 may be any feedback described herein and, likewise, the feedback may be sent via any method described herein or known in the art. Further, it is noted that in an embodiment, because the broadcast may be received with a delay at step 225, the feedback may be sent at step 227 with a similar delay. For example, while there may be no burden that would delay transmission of the feedback at step 227, the feedback will nonetheless be provided by the remote audience with a delay because of the delay with which the broadcast is received at step 225.

The method 220 continues with the system 221 receiving and storing the feedback at step 228. In an embodiment, the system 221 may store the feedback via any computational storage method known in the art. Further, the system 221 may store the feedback on any local or remotely located storage device and, thus, the system 221 may store the feedback received at step 228 on any storage device that can be communicatively coupled to the system 221. At step 229, system 221 determines at least one of the timing, nature, and magnitude of the local output, i.e., the output to be provided at the performance area that reflects the feedback received at step 228. The magnitude and nature of the output determined at step 229 may be determined according to any method described herein. For example, the "magnitude" may simply reflect all of the feedback received at step 228 or, alternatively, may be an enhanced version of the feedback received at step 228. In addition, the magnitude and nature of the feedback determined at step 229 may take into account the feedback received from similar events in the past. Past feedback, for example, may be used to make up for the delay in feedback received from the remote audience 223 at step 227. To illustrate, in an embodiment, where for example a goal is scored, the local feedback sent at step 226 may be sent as the event is occurring at the performance area and, thus, this local feedback can be used at step 229 to determine the local output. However, because of the delay with which the broadcast is received by the remote audience at step 225, the feedback sent at step 227 is, likewise, sent with a delay relative to the timing of the scoring of the goal at step 227, and, thus, the remote feedback may not yet be available at step 229 to be used in providing the local feedback with the correct timing, e.g., as the local audience is, for example, celebrating the goal. To account for this delay, in an embodiment, the system 221 uses remote feedback from a similar past event, e.g., when a goal was scored, to determine the nature and magnitude of the local feedback at step 229. In this way, the system 221 can create a "virtual presence" of the remote audience 223 with the local audience 222, even though, because of timing delays, the remote feedback sent at step 227 cannot be used. Further, according to an embodiment, the local output may be determined at step 229 according to the method 300 described hereinbelow in relation to FIG. 3. The method 220 continues with the system 221 providing the local output at step 230 and the local audience 222 receiving the output at step 231. Further, the timing of the output may be immediate, so as to coincide with what is currently occurring at the performance area.

Similar to step 229, at step 232, the system 221 determines at least one of the timing, nature, and magnitude of the remote output, i.e., the output to be provided to members of the remote audience 223. According to an embodiment, the magnitude of the remote output may be determined according to any embodiment described herein. For example, the remote output may be customized for each member of the remote audience 223, and, similar to the local output, the remote output may correspond to the feedback received at step 228 or may be an enhanced or diminished version of the feedback received at step 228. According to an embodiment of the system 220, the timing, magnitude, and nature of the remote output determined at step 232 may be based on the delay with which the broadcast is received at step 225. In other words, the determination at step 232 by the system 221 may account for the delay with which the remote audience 223 receives the broadcast. Thus, the output to the remote audience 223 may be varied so as to properly correspond to the broadcast being received by the remote audience 223.

The method 220 continues at step 233 with the system 221 providing the remote output and the remote audience 223 receiving the remote output at step 234. In an embodiment, the method 220 is continually performed throughout the duration of an event at a performance area. Thus, the method 220 continually sends a broadcast and receives feedback and determines and provides output for each component of an event at a performance area. This operation provides an enhanced viewing experience for the local audience 222 by reflecting the collective feedback of the remote audience 223 and, likewise, provides an enhanced viewing experience for the remote audience 223 by providing output to correspond to the feedback from both the local audience 222 and remote audience 223.

Figure 3:
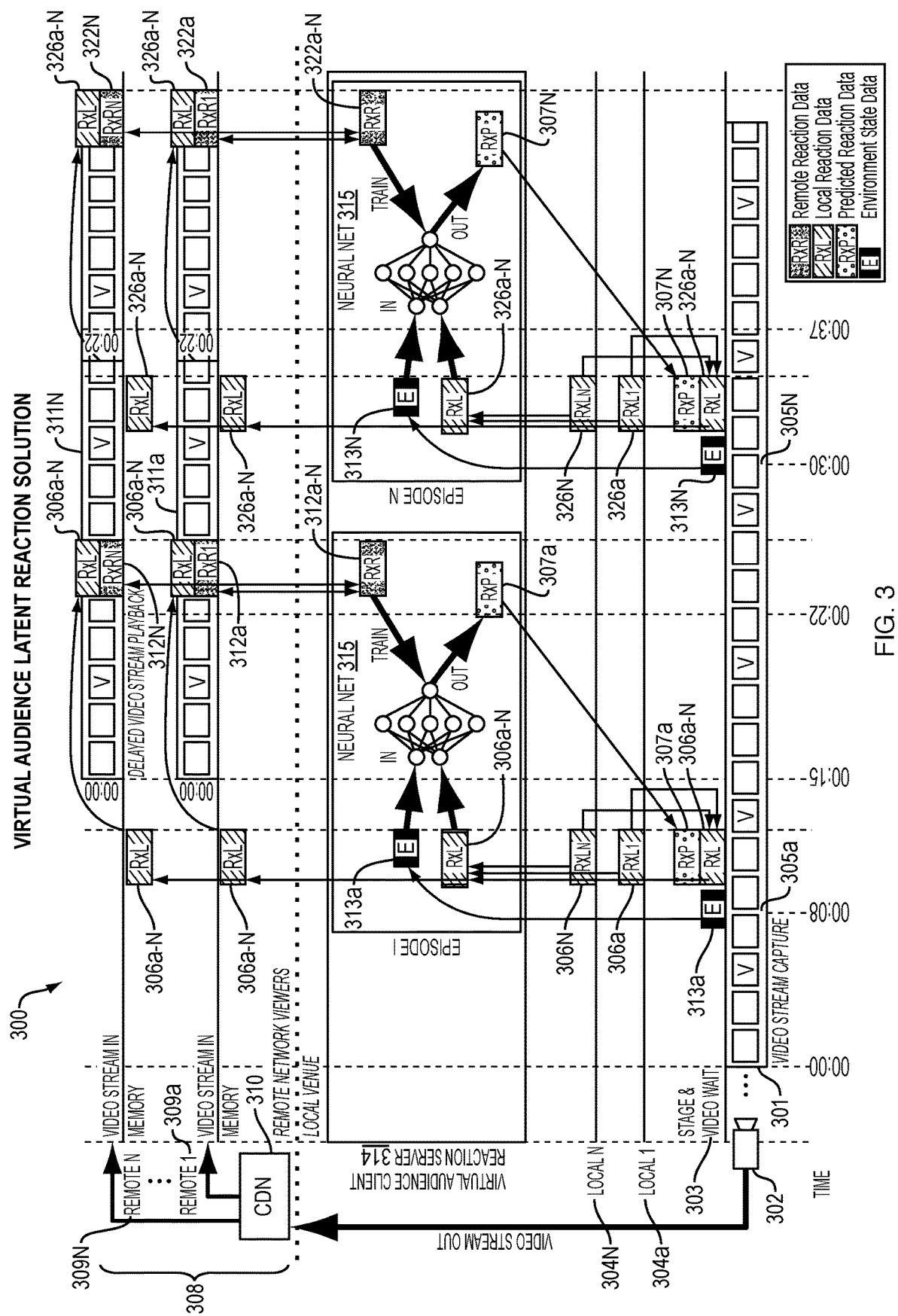
FIG. 3 is a diagram illustrating a method for providing reactions according to an embodiment of the present invention.

FIG. 3 illustrates timing and functionality of a method 300 for receiving reaction data from an audience and providing reaction data to an audience according to an embodiment. The method 300 begins with capturing a video stream 301 of a performance at a performance area 303 with a camera 302. Local audience members 304a-N at the performance area 303 view the performance while the video stream 301 of the performance is being captured. The local audience 304a-N can provide any type of reaction through any means described herein when desired. Typically, the local audience 304a-N provides reactions when an event occurs in the performance area 303. In FIG. 3, an event 305a occurs at time 00:08 and the local audience members 304a and 304N provide respective feedback 306a and 306N. According to an embodiment, the local feedback is received through any method described herein and ultimately is received at one or more computing device(s) implementing the method 300. The local feedback 306a-N is projected in the performance area 303 in real time to coincide with the event 305a. Moreover, in an embodiment, the local reactions 306a-N may also be combined with predicted remote feedback 307a and projected in the performance area 303. According to an embodiment, the timing for providing the feedback in the performance area 303 is based on the time that local feedback 306a-N is received. Details on determining the predicted remote feedback 307a is described hereinbelow.

As the performance is occurring in the performance area 303 and the video stream 301 is being captured, the video stream 301 is provided, via a content delivery network (CDN) 310, to a remote audience environment (generally referred to as 308) that includes the remote audience members 309a-N. Because of a delay in transmitting the video stream 301 via the CDN 310, the remote audience members 309a-N each receive respective copies 311a and 331N of the video stream 301 with a delay. As can be seen in FIG. 3, the video streams 311a and 311N that are received by the remote audience members 309a and 309N respectively, are received with a 15 second delay. Specifically, FIG. 3 depicts that time 00:00 of the video streams 311a and 311N received by the remote audience members 309a and 309N occurs when the video stream 301 is at time 00:15.

Similarly to the local audience members 304a-N, the remote audience members 309a-N provide reactions 312a and 312N. This remote feedback may be provided to all remote audience members 311a-N in each respective video stream 311a-N in real time as the reactions are provided. Moreover, the remote audience members 309a-N may also receive the local feedback 306a-N and this local feedback 306a-N may be provided in the respective video streams 311a-N. When the local feedback 306a-N is provided to the remote audience members 309a-N, the local feedback 306a-N is provided in the video streams 311a-N at a time corresponding to when the event 305a occurs. Furthermore, the local feedback 306a-N may be synthesized and combined with the remote feedback 313a and 313N. Further still, the remote audience members 311a-N may also receive the environment data 313a in addition to the local reaction data 306a-N.

Because of the delay with which the remote audience members 309a-N receive the video streams 311a-N, the reactions 312a-N provided by the remote audience members 309a-N are also delayed with respect to the real-time occurrence of the event 305a in the performance area 303. Thus, the remote reactions 312a-N cannot be provided in real-time in the performance area 303. Instead, the method 300 predicts the remote feedback and provides this predicted remote feedback 307a in real-time as the event 305a is occurring in the performance area 303. To determine the predicted feedback 307a, when an event in a performance occurs, such as a goal, a fight, etc., the local reaction data 306a-N and environment data 313a are provided to a reaction server 314. The reaction server 314 processes the environment data 313a and local reaction data 306a-N through a neural network 315 which predicts the remote feedback 307a. The predicted remote feedback 307a along with the local feedback 306a-n is then provided in the performance area 303 as described above. Thus, the neural net 315 predicts remote reactions based on environment state data 313a and local reaction data 306a-N. It can be said, that in such an embodiment, the remote reaction (that did not yet occur) is correlated to actual local reactions and the environment state information (i.e., the things occurring in/data about, the event in the performance area) that the audience members are reacting to. The neural net 315 learns to predict the remote reactions before they occur and these predicted remote reactions can be synthesized with the local reactions into the performance area environment 303 in real time.

In the method 300, the environment parameters 313a may be any such variables that weigh on the predicted feedback 307a and the environment parameters 313a may be tailored to the type of event occurring at the performance area 303. For example, in the instance where the event is a billiards tournament, the environment parameters 313a may include: amount of tournament completed, player information, player's probability of making a point, game completion percentage, player done percentage, i.e., how close a player is to a final goal, the level of rivalry between opponents, a number of points made in a row, probability of the current run, difficulty of the last shot, success of last shot, distance miss of last shot, and speed of last shot, amongst others. Other environment parameters include: the number of people logged in (i.e., number of audience members), past reactions to similar events, type of event, gravity of event, score line, percentage of completion of event, and the likelihood of the event. Moreover, in an embodiment, the environment parameters 313a may include any data that is observable by the systems described in the applications, U.S. Provisional Application No. 62/619,353 entitled "ENHANCED BILLIARD TABLE SYSTEMS AND METHODS" by Ira Lee, filed on Jan. 19, 2018 and U.S. Provisional Application No. 62/671,578 entitled "ENHANCED GAMING SYSTEMS AND METHODS" by Ira Lee, filed on May 15, 2018, the entire teachings of which are incorporated herein by reference. It should be known to those of skill in the art that the foregoing list of environment parameters is in no way limiting and embodiments may consider any data that has any bearing on audience reactions. Moreover, in embodiments, the environmental parameters may be tailored to the type of environment and type of event at the performance area.

As described above, the neural net 315 receives local reaction data 306a-N. In embodiments, the local reaction data 306a-N may include any data about any type of reaction that local audience members provide. For instance, local reaction data 306a-N may include the number of local audience members, number of claps, average level of claps, average frequency of claps, total count of cheers, total count of snaps, total count of whistles, total count of boos, total count of oohs, total count of aahs, and cheer indicator types. Moreover, the foregoing list of local reaction data is in no way limiting and the local reaction data may include any data related to reactions.

In order to determine the predicted reactions 307a, the neural net 315 is trained with remote reaction data and environment parameters that resulted in the remote reaction data. Thus, in the method 300, the neural net 315 receives the remote reactions 312a-N and is trained to predict remote reactions based on environment state data and local reaction data. It can be said that the training correlates the remote reaction (that did not happen yet) to actual local reactions and the environment state information (that the local audience is reacting to). The neural net 315 learns to predict the remote reactions before the remote reactions occur and synthesize the remote reactions to be injected into the actual environment 303 in real time. Thus, remote reactions inform future reactions. Once trained, the neural net 315 is used throughout the performance. Moreover, the neural net may be tailored to each event type and an appropriate neural net that is trained for each event type may be selected to be used. The neural net 315 may operate according to any neural net known in the art and likewise, may be trained using any method known in the art to adjust weights of the neural net 315.

The process 300 continues indefinitely as a performance in the performance area 303 is ongoing. Thus, the camera 302 continues to capture the video stream 301 and then, whenever an event occurs, the method repeats as described herein. To illustrate, at time 00:30 an event 305N occurs in the performance area 303 and the local audience members 304a-N provide reactions 326a-N. The environment data 313N for the event 305N and the local reaction data 326a-N is provided to the neural net 315 and the neural net 315 determines the predicted reaction data 307N. The local reaction data 326a-N is projected along with the predicted reaction data 307N in the performance area 303. The remote audience members 309a-N continue to receive the respective video streams 311a-N with a delay and when the event 305N is viewed, the remote audience members 309a-N provide the remote reactions 322a-N. Further, the video streams 311a-N include the local audience feedback 326a-N along with the feedback of the remote audience members 322a-N. Further sill, the remote feedback 322a-N is provided to the neural net 315 for further training.

Figure 4:
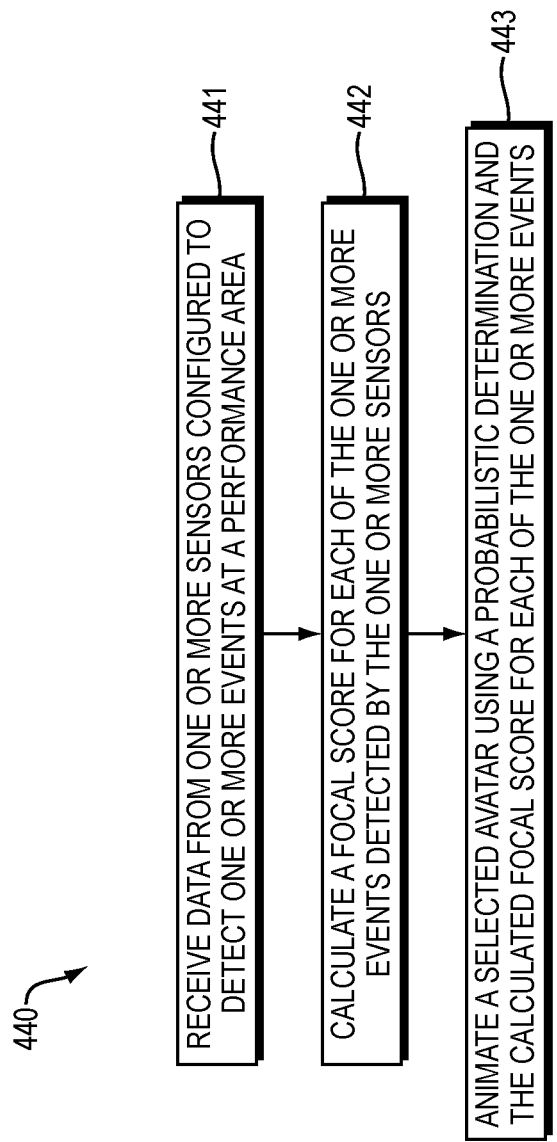
FIG. 4 is a flow chart of a method for animating a virtual audience according to an embodiment.

FIG. 4 is a flow chart of a method 440 for animating an avatar. The method 440 may be used in embodiments described herein to animate avatars, such as the avatars 105a-n depicted on the display 104 in the performance area 101 shown in FIG. 1. The method 440 begins at step 441 by receiving data from one or more sensors configured to detect one or more events at a performance area. According to an embodiment, the method 440 is implemented on a computing device and at step 441 the data is received from any point communicatively coupled to the computing device implementing the method 440. Further, the sensors may be any sensors known in the art, such as motion sensors, cameras, microphones, and heat sensors, among other examples. Moreover, the data received at step 441 may include any data including, multi-cast data, that is observable by the systems described in the applications, U.S. Provisional Application No. 62/619,353 entitled "ENHANCED BILLIARD TABLE SYSTEMS AND METHODS" by Ira Lee, filed on Jan. 19, 2018 and U.S. Provisional Application No. 62/671,578 entitled "ENHANCED GAMING SYSTEMS AND METHODS" by Ira Lee, filed on May 15, 2018, the entire teachings of which are incorporated herein by reference.

In turn, at step 442 a focal score is calculated for each of the one or more events detected by the one or more sensors. In an embodiment, events for which to calculate focal scores are identified from the sensor data based on configured parameters. For instance, a user may indicate that a focal score is calculated for every movement or for every sound above a certain threshold, amongst other examples. In embodiments, the type of events that focal scores are calculated for may be application dependent, i.e., events that get focal scores may change based on the type of performance and such settings may be configured by a user. Determining what events get focal scores may be based on any factor that a user wants to consider for determining what avatars should focus on. In an embodiment, the focal score is calculated using the sensor data received at step 441. For example, the focal scores may be a function of event magnitude, motion speed, and sound level, amongst other examples. Further, focal score may be based upon any factor that a user wants to influences avatar animation. Thus, the focal score determination may be modified by a user based upon whatever factors a user believes should have bearing on what avatars focus on.

To continue, at step 443, an avatar is animated using a probabilistic determination and the calculated focal score for each of the one or more events. The probabilistic determination may probabilistically weigh the focal scores for each event and then randomly select which event each avatar should focus on. To illustrate the probabilistic determination, if, for example, there are two events with respective focal scores of 10 and 5, approximately two thirds of the avatars will be depicted focusing on the event with a focal score of 10 and one third of the avatars will be depicted focusing on the event with a focal score of 5. The animation of avatars may also be modified based on respective avatar attention spans. The respective attention spans may be used to determine how long each avatar observes each event. In embodiments, avatar attention span may be set randomly or may be based on configurable parameters set by a user. Attention span may be varied depending on the event type or a theme of the event that the user wants to convey.

Further still, avatar animation may be modified based on at least one of: event location, sound location, and motion location. For instance, if a given avatar is depicted on a portion of a display, a modification can be made to the avatars animation control determination to make it more likely that the avatar will look at events closer to where the avatar is depicted. To illustrate, if there are two events, each with a focal score of 5, an avatar would have a 50/50 chance of focusing on either event. However, if for example, one of the events occurred geographically closer to where the avatar is depicted, the probability determination used to determine the avatar's animation may be modified so that there is a 75% chance that the avatar will focus on the closer event.

Animating the avatars at step 443 may include controlling head and eye movement of the avatars to be directed to particular events. If, for example, there are two avatars, it may be determined based on the focal scores and probabilistic determination that the first avatar looks at one event and the second avatar looks at another event and, thus, the avatars may be independently controlled accordingly. Further, in another embodiment, the animation performed at step 443 may also consider the location at which an avatar is depicted on a display. For instance, at step 443 it may be determined that an avatar's attention should be focused on an event that is physically in closer proximity to the avatar's depicted location on a display.

Figure 5:
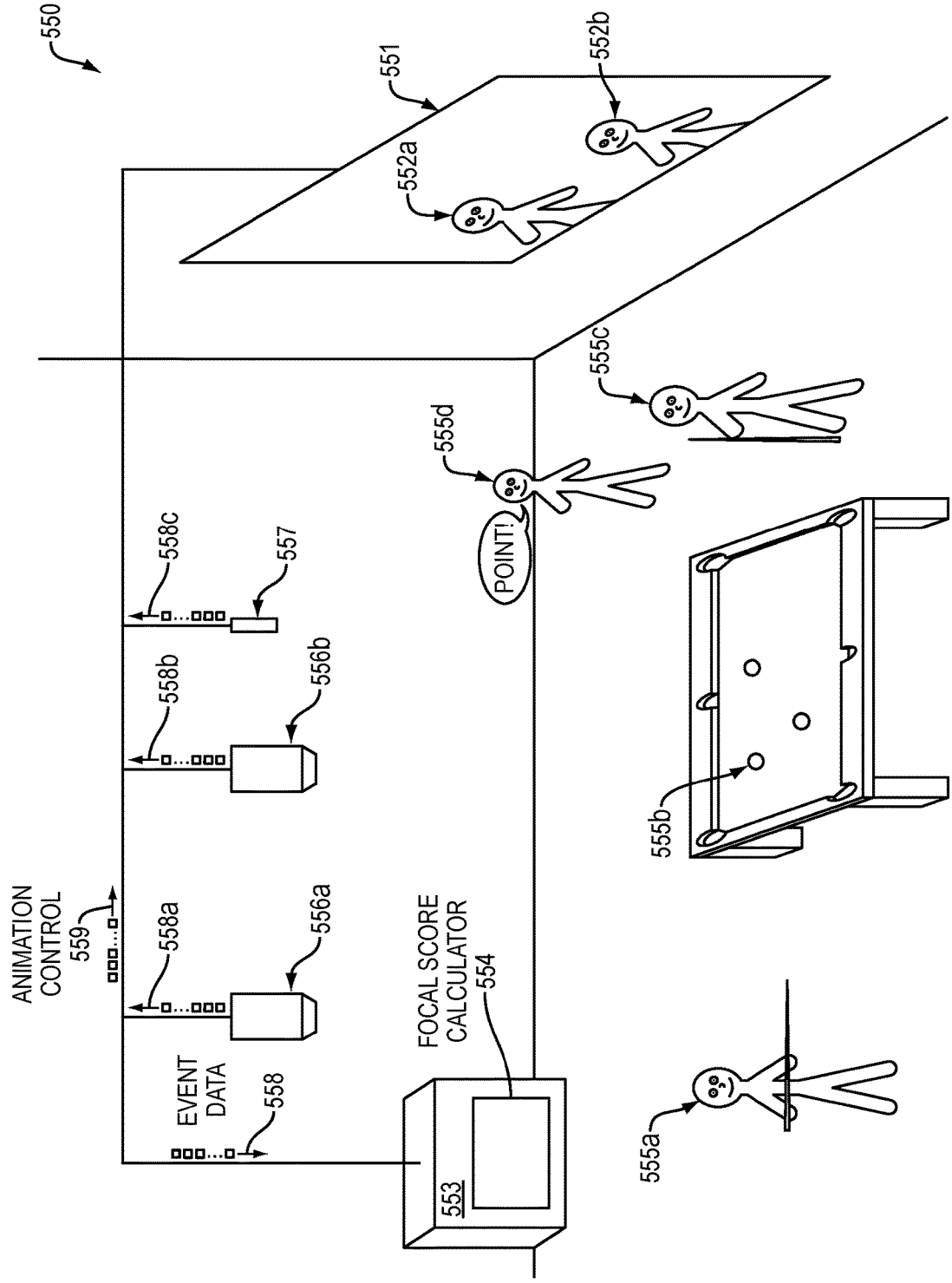
FIG. 5 is a simplified drawing of an environment in which an embodiment of the present invention may be implemented.

FIG. 5 illustrates an example performance area 550 where focal scores are determined using the method 440 to animate the avatars 552a-b. In the system 550, event data 558a-c, collectively 558, is collected by the cameras 556a-b and the microphone 557. It is noted that while the area 550 is depicted as including the cameras 556a-b and microphone 557, embodiments are not so limited and may collected data using methods known in the art and any methods of data collection described in the related applications, U.S. Provisional Application No. 62/619,353 entitled "ENHANCED BILLIARD TABLE SYSTEMS AND METHODS" by Ira Lee, filed on Jan. 19, 2018 and U.S. Provisional Application No. 62/671,578 entitled "ENHANCED GAMING SYSTEMS AND METHODS" by Ira Lee, filed on May 15, 2018. The event data 558 is transferred to the computing system 553 that includes the focal score calculator component 554. In turn, the focal score calculator 554 determines a focal score for each respective event. In the system 550, the events include the player 555a, motion of the billiard ball 555b, the player 555c observing, and the official 555d speaking that a player earned a point. Through analysis of the event data 558, the events 555a-d are identified and focal scores for each event 555a-d are determined. The events 555a-d for which focal scores are calculated may be determined based upon user configured parameters and likewise, the calculation for focal scores themselves may be determined based upon user configured parameters. For instance, a user may set that a focal score should be calculated for every motion and sound and the focal score is based on the magnitude of the motion and sound.

From the calculated focal scores, the computing system 553 determines the animation controls 559, which are sent to the display 551 to control the renderings of the digital avatars 552a and 552b. In an embodiment, the computing system 553 determines the animation controls using a probabilistic determination as described hereinabove in relation to FIG. 4. According to an embodiment of the system 550, individual animation controls may be determined for each avatar or, alternatively, animation controls may be determined for subsets of the avatars. For example, in an embodiment, groupings of avatars are determined based on the location of the avatars in the groupings and the same animation controls may be used for each avatar in the grouping. In another embodiment, the animation controls are varied based on the location on the screen 551 at which the avatar is rendered. Thus, if an avatar is rendered on a portion of the display 551 that is closer to an event 555a-d, the animation controls can be set to ensure that the avatar is controlled to look at the closer event. Furthermore, the animation controls 559 may control any features of the digital avatars, such as head, eye, arm, and hand appearance and movement. The animation of avatars may also be modified based respective avatar attention spans. The respective attention spans may be used to determine how long each avatar observes each event. In embodiments, avatar attention span may be set randomly or may be based on configurable parameters set by a user. Attention span may be varied depending on the event type or a theme of the event that the user wants to convey. Further still, avatar animation may be modified based on at least one of: event location, sound location, and motion location.

It is noted that, while the system 550 depicts a particular configuration of sensors, e.g. the cameras 556a-b and microphone 557 coupled to the computing device 553, embodiments of the invention are not so limited. Embodiments may utilize any variety of sensors in any variety of configurations, such as those described in the related applications, U.S. Provisional Application No. 62/619,353 entitled "ENHANCED BILLIARD TABLE SYSTEMS AND METHODS" by Ira Lee, filed on Jan. 19, 2018 and U.S. Provisional Application No. 62/671,578 entitled "ENHANCED GAMING SYSTEMS AND METHODS" by Ira Lee, filed on May 15, 2018, the entire teachings of which are incorporated herein by reference. Likewise, while a single computing system 553 and a single focal score calculator 554 are depicted, embodiments are not so limited and embodiments may use any combination of computing devices, systems, and subsystems to calculate focal scores and determine animation controls. For instances, focal scores may be calculated by a plurality of subsystems that obtain the variety of different environment data. Moreover, in embodiments, the sensors may communicate with the computing device 553 via any communication method known in the art and the computing device 553 may be located anywhere so long as the sensor data 558 can be transferred to the computing device 553.

Further still, audio controls may likewise by determined in the system 550. Specifically, the event data 558 may be processed by the computing device 553 to determine audio to provide in the environment 550 via the display 551 and through any means of audio output known in the art.

Figure 6:
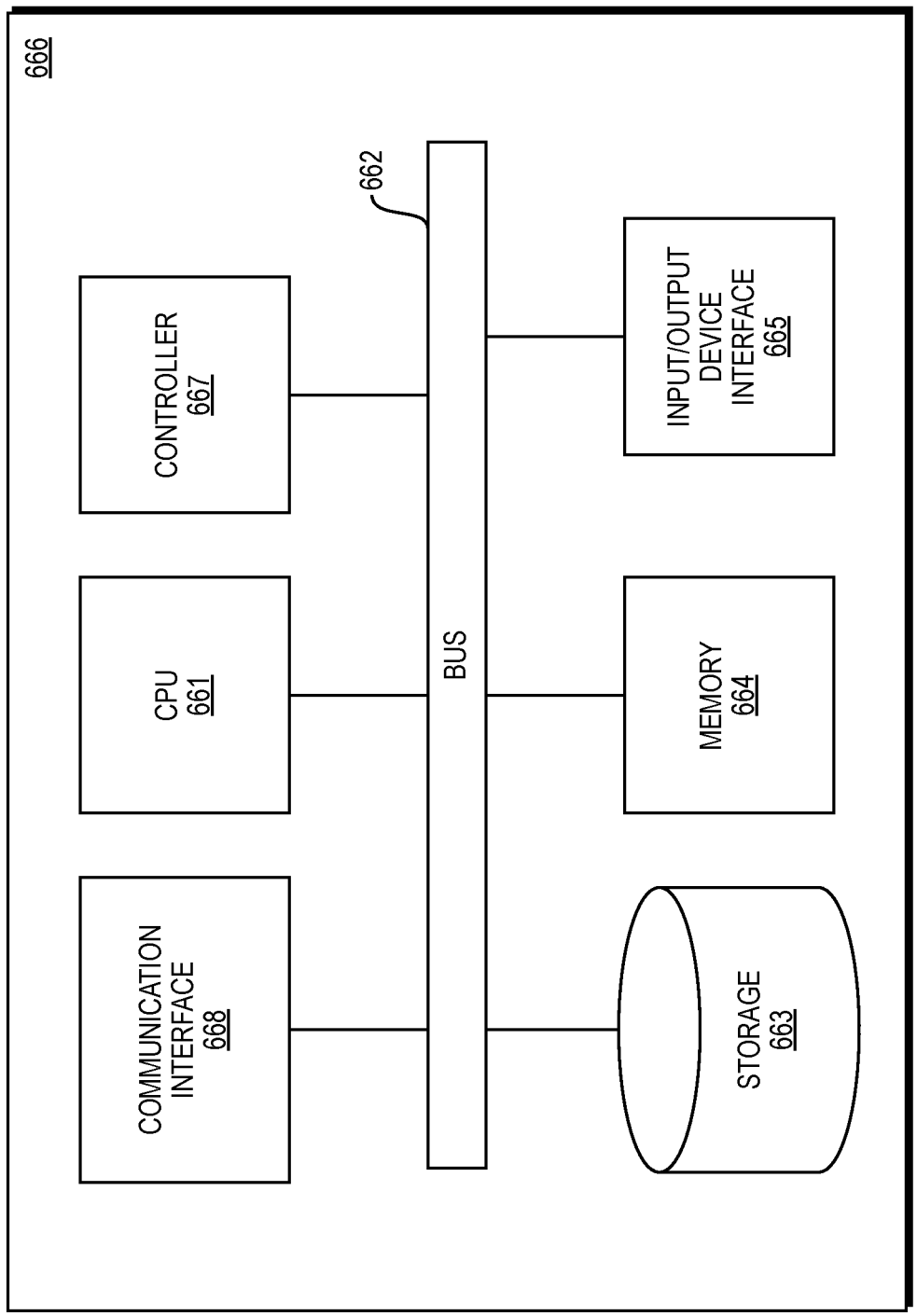
FIG. 6 is a simplified block diagram of a computer system in which embodiments of the present invention may be embodied.

FIG. 6 is a simplified block diagram of a computer-based system 666 that may be used to generate a virtual audience according to any of the embodiments of the present invention described herein. For example, the computing device 106 described hereinabove in relation to FIG. 1 may be implemented by the computer-based system 666. The system 666 includes a bus 662. The bus 662 serves as an interconnect among the various components of the system 666. Connected to the bus 662 is an input/output device interface 665 for connecting various input and output devices such as a keyboard, mouse, display, speakers, cameras, microphones, and sensors to the system 666. A central processing unit (CPU) 661 is connected to the bus 662 and provides for the execution of computer instructions. Memory 664 provides volatile storage for data used for carrying out computer instructions. Storage 663 provides non-volatile storage for software instructions, such as an operating system (not shown). The system 666 also comprises a communication interface 668 for connecting to any variety of devices, e.g., sensors, and networks known in the art, including wide area networks (WANs) and local area networks (LANs).

It should be understood that the example embodiments described herein may be implemented in many different ways. In some instances, the various methods and machines described herein may each be implemented by a physical, virtual, or hybrid general purpose computer, such as the computer system 666, or a computer network environment, such as the computer environment 1220, described hereinbelow in relation to FIG. 12. The computer system 666 may be transformed into the machines that execute the methods described herein, for example, by loading software instructions into either memory 664 or non-volatile storage 663 for execution by the CPU 661. One of ordinary skill in the art should further understand that the system 666 and its various components may be configured to carry out any embodiment or combination of embodiments of the present invention described herein. Further, the system 666 may implement the various embodiments described herein utilizing any combination of hardware, software, and firmware modules operatively coupled, internally, or externally, to the system 666.

Figure 7:
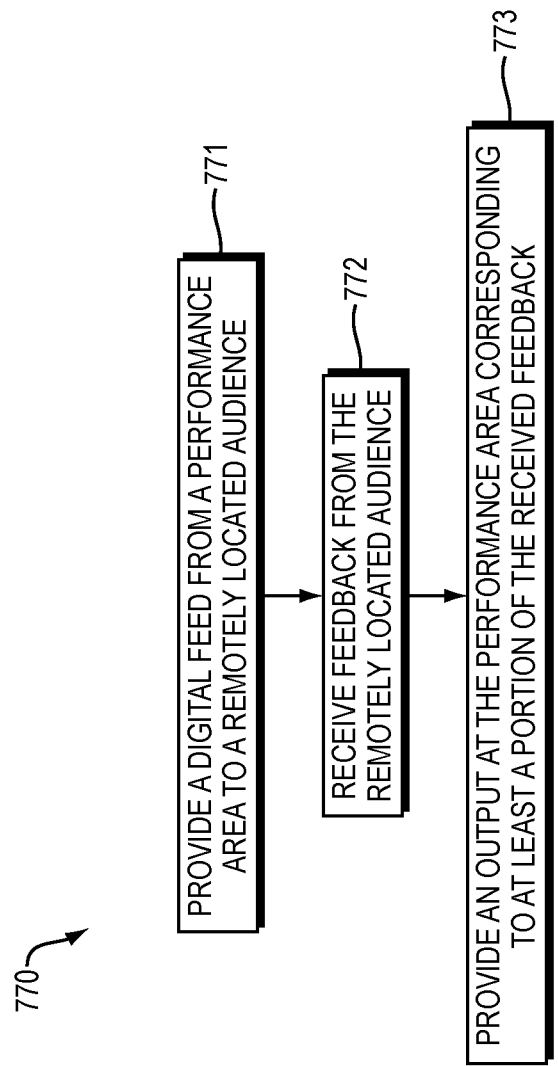
FIG. 7 is a flow diagram of a method for providing a virtual audience according to an embodiment.

FIG. 7 is a flowchart of a method 770 for creating a virtual audience according to an embodiment. The method 770 begins at step 771 by providing a digital feed from a performance area to a remotely located audience. According to an embodiment of the method 770, the digital feed may be any digital feed known in the art, such as an audio or video feed, and the digital feed may be provided via any communication method. The remotely located audience members who receive the digital feed may be any number of people or groups of people. Likewise, the digital feed may be provided to any number of computing devices or display devices associated with the members of the remotely located audience.

At step 772, the method 770 continues and receives feedback from the remotely located audience. The feedback received at step 772 may be in the form of any feedback described herein and, likewise, may be received via any communication method known in the art. In turn, at step 773 the method provides an output at the performance area corresponding to at least a portion of the received feedback. This output thus provides some indication of the remotely located audience and, thus, creates a virtual audience at the performance area. According to an embodiment, the output at step 773 may be provided via any method described herein. Further, it is noted that the method 770 may further include providing any of the functionality of any of the embodiments of the present invention described herein.

Figure 8:
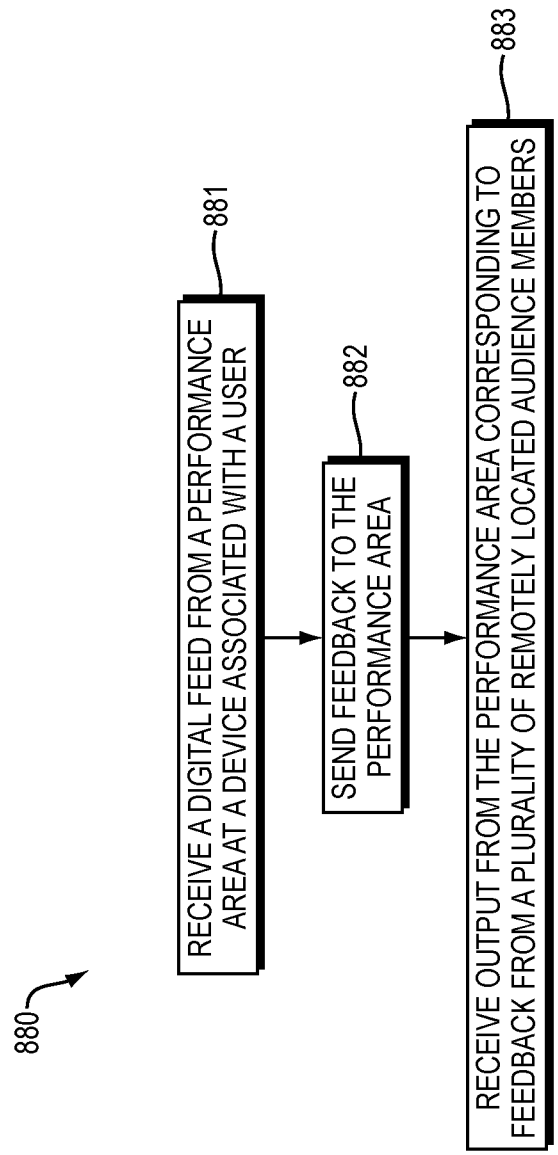
FIG. 8 is a flow chart of a method for facilitating remote audience participation according to an embodiment.

FIG. 8 is a flow diagram of a method embodiment 880 for facilitating remote audience participation. According to an embodiment, the method 880 may be performed via a computing device, associated with an audience member, that is located remotely in relation to a performance area. For example, according to an embodiment, the method 880 is implemented via an application on a user device or through a user accessing a communications network such as the internet. In an implementation, a plurality of remotely located audience members exist and each of the plurality of remote audience members executes an instance of the method 880 so as to facilitate remote audience participation.

For a given remotely located audience member, the method 880 begins with step 881 by a device associated with a user who is a member of the remotely located audience receiving a digital feed from a performance area. According to an embodiment, the digital feed may be any type of digital feed known in the art, such as a video feed, audio feed, or multimedia feed. Further, the digital feed may be received via any communication means known in the art and, likewise, may be received at any type of electronic device known in the art. Similarly, the digital feed may be received from any performance area as described herein.

In response to the received digital feed, at step 882 the method 880 continues by sending feedback to the performance area. At step 882, the feedback may be any type of feedback described herein and likewise may be sent via any means described herein. For example, in an embodiment of the method 880 the feedback sent to the performance area is a signal from an accelerometer coupled to the device associated with the user. In another embodiment of the method 880, the feedback sent to the performance area is selected from a feedback listing. In such an embodiment, the feedback listing may be displayed in a graphical user interface on the device associated with the user and then one or more feedback type in the listing may be selected by the user. According to such an embodiment, the feedback listing may include at least one of: clapping, stomping, booing, a spoken statement, a physical change to the performance area, and text. In an embodiment, the feedback is used, possibly through further processing, to provide output at a performance area. For example, text feedback may be converted to speech and used as output or the text may be used on a sign depicted at the performance area.

To continue, at step 883 output from the performance area corresponding to feedback from a plurality of remotely located audience members is received. In an example embodiment, the output from the performance area is received at the user device and, further, the output may be received via any communication means known in the art. Further, the output may be any such performance area output described herein. For example, the output received at step 883 may be applause played at the performance area that reflects the collective applause received from a plurality of remotely located audience members.

In another embodiment of the method 880, the method further comprises enabling communication among a plurality of remotely located audience members. In an embodiment, enabling such communication may include providing an interface to facilitate one or more of text, voice, and video communication among remotely located audience members.

An alternative embodiment of the method 880 further includes receiving feedback from the performance area regarding a digital avatar depicted in the performance area. In an embodiment, the feedback is related to an avatar in the performance area that corresponds to the remotely located audience member receiving the feedback. According to an embodiment, the feedback is a depiction of the avatar as the avatar is, was, or is going to be displayed in the performance area. In yet another embodiment, the feedback received from the performance area is related to impropriety of an action of the remote audience member. This functionality may be used to monitor and supervise the remotely located audience members and to control bad actors, e.g., trolls.

Yet another embodiment of the method 880 further includes displaying data related to the performance area in a plurality of panels of a graphical user interface on the device associated with the user. According to an embodiment, the displayed data may include any data related to the performance area described herein. For example, in an embodiment, a first panel depicts the received output from the performance area, a second panel depicts the digital feed, and a third panel depicts an avatar associated with the user. In yet another embodiment, a panel, such as the first panel, further depicts scores associated with an event at the performance area. According to another embodiment, the output from the performance area depicted in the panel of the graphical user interface illustrates a plurality of digital avatars corresponding to the plurality of remotely located audience members. Example graphical user interfaces that may depict the data related to the performance area in embodiments are described hereinbelow in relation to FIGS. 9A-9C.

An embodiment of the method 880 further includes receiving a digital rendering of a physical object from the performance area. According to an embodiment, the digital rendering may be in the form of a scan of a physical object such as a score sheet.

Figure 9A:
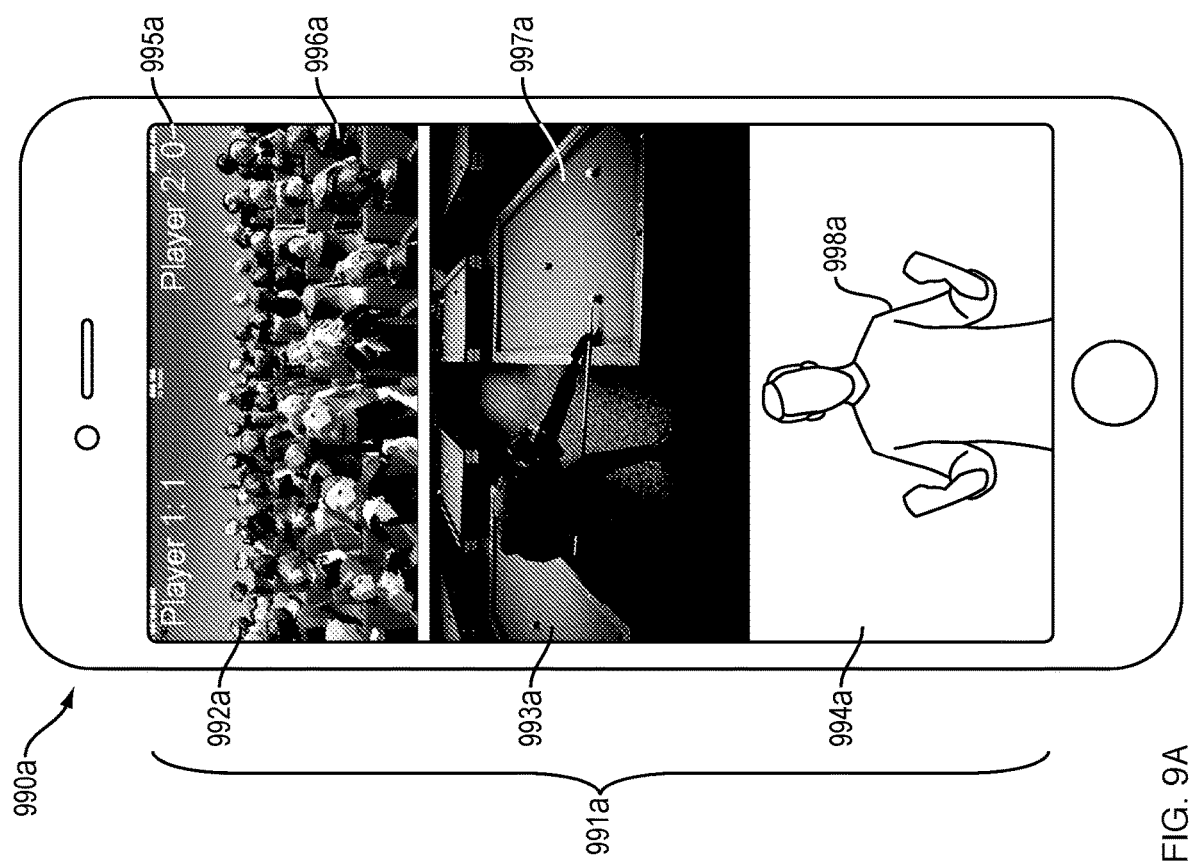
FIGS. 9A-C depict graphical user interfaces for facilitating remote audience participation that may be used in embodiments.

FIG. 9A depicts a user device 990*a* with a graphical user interface 991*a* displayed on the device 990*a*. Embodiments of the present invention may use the graphical user interface 991*a* to implement the various methods and systems for creating virtual audiences and for facilitating remote audience participation as described herein. For example, in an implementation, the method 880 may be implemented via the graphical user interface 991*a*. Likewise, the graphical user interface 991*a* may be used on the devices 115*a*-*n* of the system 100 shown in FIG. 1 to facilitate generating a virtual audience. Further, the graphical user interface 991*a* may be the graphical user interface of an application that facilitates remote audience participation and furthermore, is used in creating a virtual audience as described herein.

The graphical user interface 991*a* is composed of three panels 992*a*, 993*a*, and 994*a*. The number of panels and the location and size of each panel can change. The panel 992*a* depicts a virtual audience composed of avatars 996*a*. According to an embodiment, the virtual audience displayed in the panel 992*a* may depict, illustrate, or simulate the virtual audience displayed at a performance area as described herein. Further, the virtual audience displayed in the panel 992*a* may be customized for the virtual audience or members thereof. In other words, the virtual audience displayed in the panel 992*a* may illustrate an audience that shows any combination of audience members local to an event with their participation feedback and audience members located remotely in relation to an event with their participation feedback. In another embodiment, the audience displayed in the panel 992*a* may be customized to illustrate the location of an avatar associated with a user of the device. In addition, the panel 992*a* may display the event scores 995*a*. Further, it is noted that while the event scores 995*a* are depicted in the panel 992*a*, in alternative embodiments the event scores 995*a* may be in any of the panels 992*a*, 993*a*, and 994*a*, or in a separate panel. Further still, the panel 992*a* or one of the other panels may display any data related to an event in a performance area. For example, the panel 992*a* may depict the remaining time and player statistics, among other examples.

The panel 993*a* depicts a feed from the performance area. In the example of FIG. 9A, the panel 993*a* depicts a video feed showing billiard gameplay 997*a*. Embodiments of the graphical user interface 991*a* may be used to depict any feed known in the art and, likewise, the feed depicted in the panel 993*a* may be from any performance known in the art. Further still, embodiments of the graphical user interface 991*a* may be used live, i.e., as an event at a performance area is occurring or, alternatively, may be used to watch a feed recorded from an event. Thus, the panel 993a may depict a live event or may access and depict a recorded feed from a past event.

The panel 994a depicts an avatar 998a associated with a user of the device 990a. Further, the panel 994a may animate the avatar 998a to depict feedback provided by the user of the device 990a. For example, if the user provides clapping feedback in response to an event shown in the panel 993a, the avatar 998a may be animated clapping.

Figure 9B:
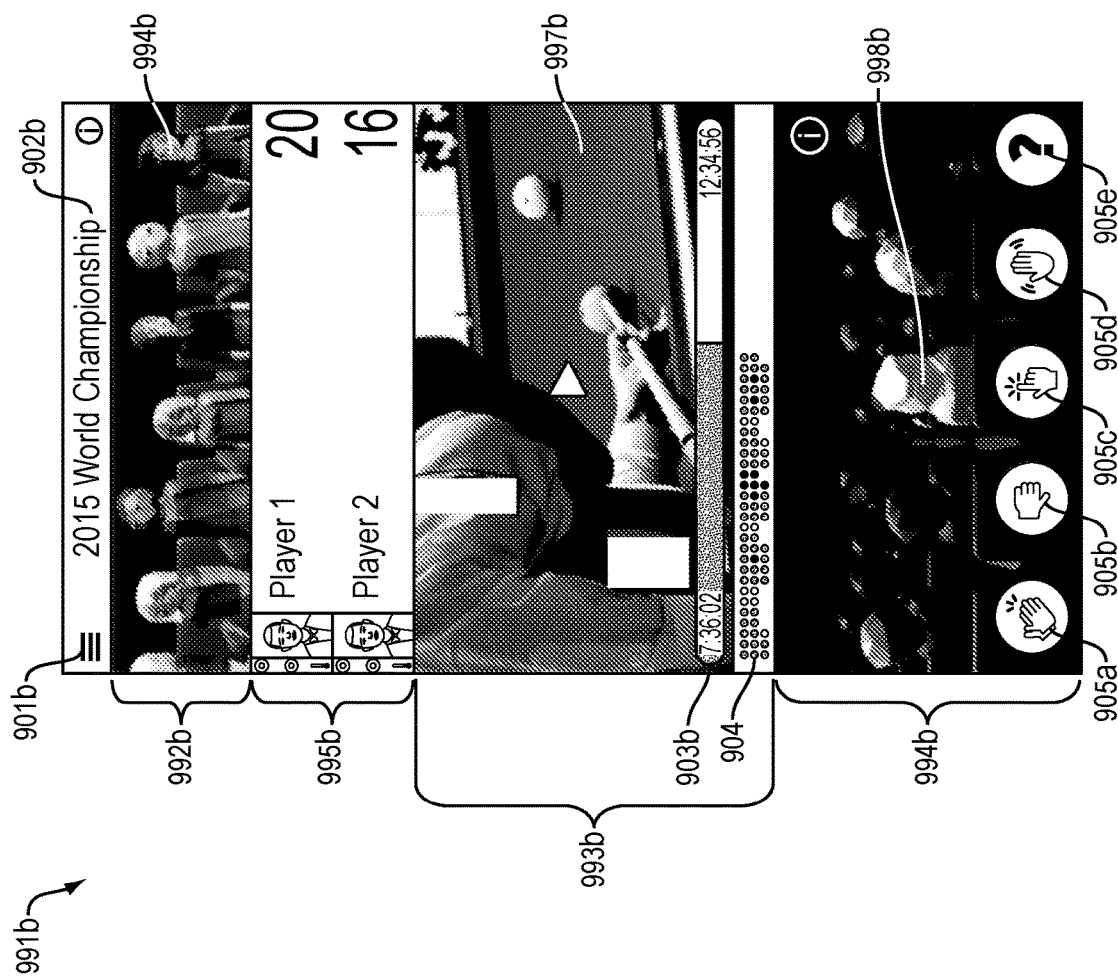

FIG. 9B is another graphical user interface 991b that may be employed in embodiments of the invention. The graphical user interface 991b includes the title bar, 902b which also includes the expandable menu listing 901b. Like the graphical user interface 991a, the graphical user interface 991b includes a plurality of panels 992b-995b that display information to a user. The panel 992b displays a virtual audience composed of avatars 994b. The panel 995b displays scores related to the event 997b depicted in the panel 993b. Like the graphical user interface 991a of FIG. 9A, the panel 993b may display a feed from any performance area known in the art. Further, the panel 993b may display a pre-recorded feed of an event and in such an embodiment may display a time progress bar 903b. The graphical user interface also includes a rendering of crowd reaction 904. The panel 994b displays a virtual audience and rear view of the avatar 998b. According to an embodiment, the avatar 998b is an avatar associated with a user of the graphical user interface 991b and, thus, the panel 994b provides a view for the user illustrating his or her corresponding avatar 998b positioned in the virtual audience.

The graphical user interface 991b also includes the feedback tools 905a-e. The tools 905a-e allow a user to provide feedback in response to the event 997b. The tools 905a-e are displayed on a touch screen device and upon selecting one of the tools 905a-e, the feedback is provided to a device used to aggregate feedback, such as the computing device 106. The tool 905a indicates applause feedback and the button 905b indicates negative feedback. Further, the buttons 905c and 905d indicate different control options that are available to the user. Moreover, in an embodiment, a user can configured the various control options displayed. Further, the button 905e is a help tool that allows a user of the graphical user interface and underlying application to get help with using the graphical user interface 991b. The graphical user interface 991b can also be customized by a user. For instance, a user can select to include panels for creating a sign, chatting, and customizing his avatar, amongst other options. Further, the user can customize which panels are displayed and properties of the panels including panel size, location, and order.

Figure 9C:
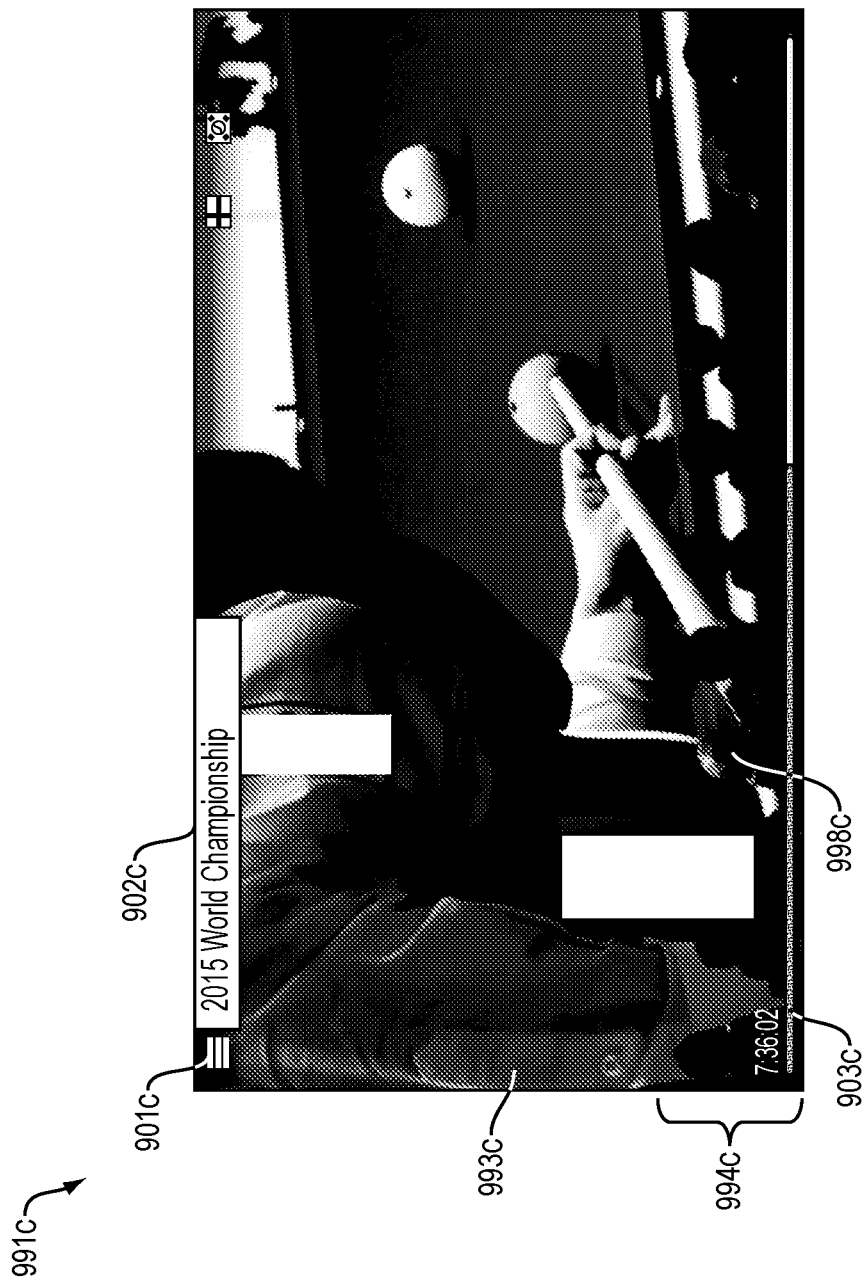

FIG. 9C illustrates another graphical user interface 991c that is used for implementing remote audience member participation. According to an embodiment, the graphical user interface 991b is displayed when a device is held in a portrait orientation and the graphical user interface 991c is displayed when the device is held in a landscape orientation. The graphical user interface 991c displays the video feed 993c of an event at a performance area. Further, the graphical user interface 991c includes a title 902c of the event as well as an expandable menu bar 901c. The menu bar may include any variety of controls and options. The graphical user interface includes a depiction of the virtual audience 994c and a highlighted avatar 998c that corresponds to the user of the graphical user interface 991c. The graphical user interface 991c also displays a progress bar 903c in an embodiment where the displayed feed 993c is pre-recorded.

It should be understood that the graphical user interfaces 991a-c are merely examples and that embodiments of the present invention may use graphical user interfaces with more or fewer panels of varying size and shape, that may display any variety of information and data. According to an embodiment, the graphical user interface (generally referred to herein as 991) may be customized by a user. In such an embodiment, the user can determine what is displayed, where it is displayed, and the sizes at which the selected items are displayed. In such an embodiment, the customization of the graphical user interface may be implemented through a menu, where different display options are selected. In yet another embodiment, panels are displayed on a device and the user can rearrange the panels, re-size the panels, and delete and add panels to create a custom graphical user interface.

Figure 10:
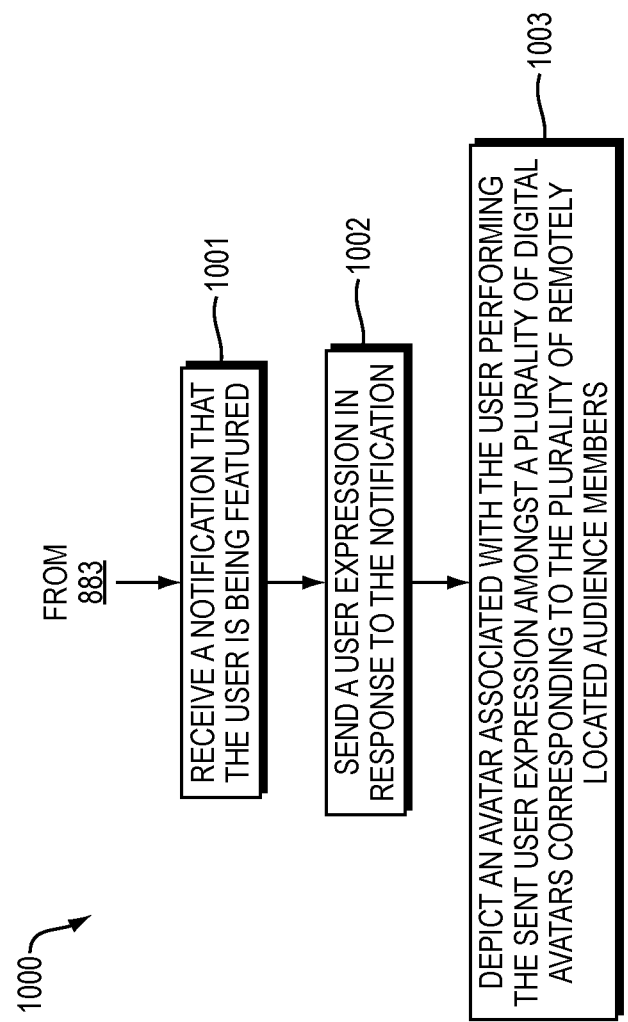
FIG. 10 is a flow diagram of a method of facilitating remote audience member participation according to an embodiment.

FIG. 10 is a flowchart of a method 1000 for enhancing remote audience participation. According to an embodiment, the method 1000 continues from step 883 of the method 880, however, it is noted that the method 1000 may be implemented before or after any step of the method 880 and, further, the method 1000 may be implemented separately from the method 880.

The method 1000 begins at step 1001 by receiving a notification that the user is being featured. This notification may be received via any communication method known in the art and likewise, may take the form of any notification method. In an example embodiment where the method 880 is implemented via an application on a user device, the notification may sent to the user via the application or may be a text or voice notification received via a computing device associated with the user device.

The method 1000 continues at step 1002 with the user sending a user expression in response to the notification. The user expression sent at step 1002 may be any type of feedback described herein. Further, the user expression may include avatar movements, a sign with words, or any type of feedback that the user would like to express. According to an embodiment, the user selects the expression that he or she would like to provide via a menu and then selects options to customize the selected expression. For example, if the user indicates he or she would like to hold up a sign, the user can select a sign and then choose the text and color of the sign.

At step 1003 of the method 1000, an avatar associated with the user is depicted performing the sent user expression. In an embodiment, the avatar is depicted amongst a plurality of digital avatars corresponding to the plurality of remotely located audience members. According to an embodiment, the avatar is depicted, e.g., animated, performing the sent expression in an audience displayed on a graphical user interface, such as an avatar in one of the audiences 992a, 994a, 992b, 994b, or 994c. In another embodiment, the avatar performing the sent user expression is depicted in an audience displayed at a performance area, such as the avatar audience 1100a described herein below in relation to FIG. 11A.

Figure 11A:
FIGS. 11A-C illustrate example virtual audiences that may be provided by embodiments.

FIG. 11A depicts an example virtual audience 1100a that may be displayed in a performance area or on a graphical user interface in embodiments of the present invention. For example, the virtual audience 1100a may be depicted on the display 104 of FIG. 1. The example virtual audience 1100a is composed of avatars 1101. In an embodiment the avatars 1101 are animated to provide feedback to audience members who view the virtual audience 1100a.

Figure 11B:
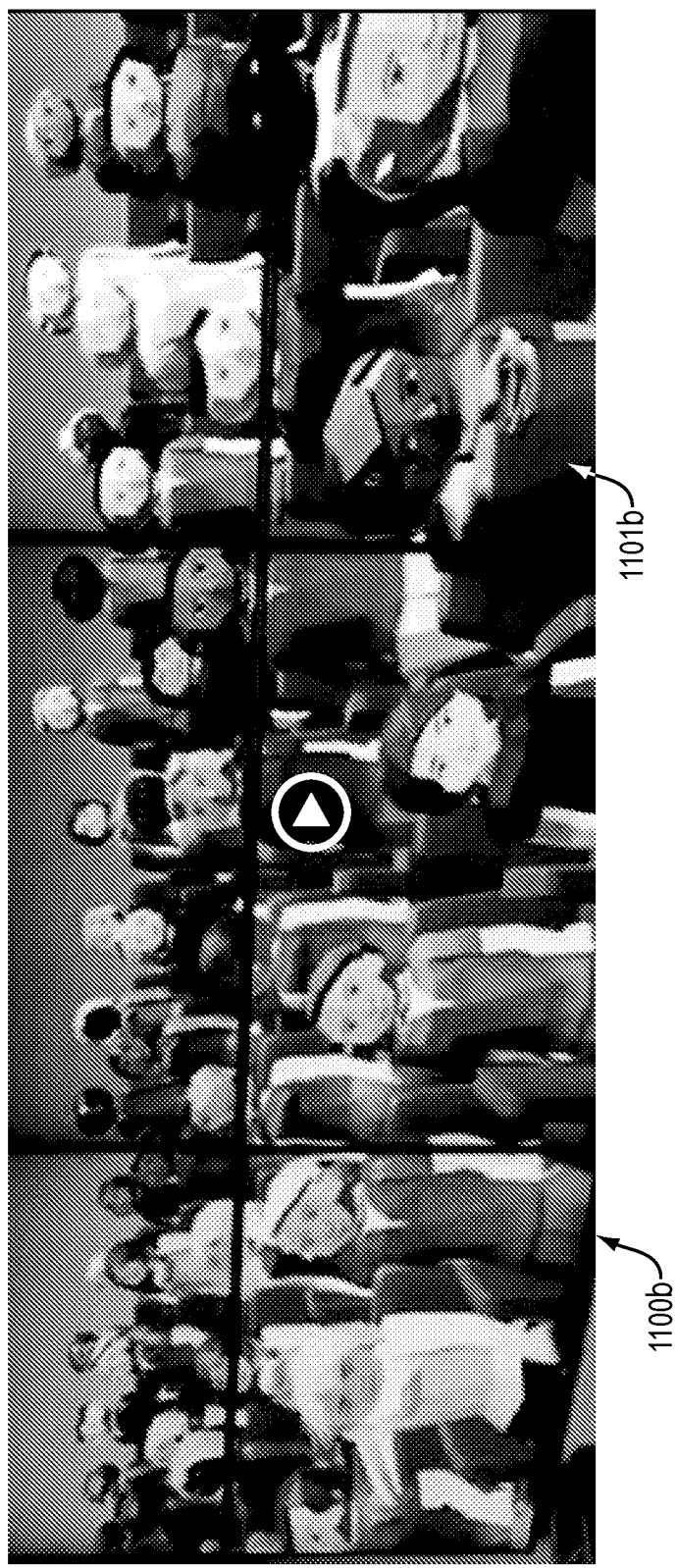

FIG. 11B depicts another example virtual audience 1100b that may be displayed at a performance area or via a graphical user interface to remotely located audience members. Like the audience 1100*a*, the audience 1100*b* is composed of avatars 1101*b*. As described herein, the avatars 1101*b* may be animated to correspond to feedback provided by audience members. Likewise, head and eye movement of avatars 1101*b* may be controlled according to the method 440 described hereinabove in relation to FIG. 4. Thus, in an example embodiment where the virtual audience 1100*b* is displayed at a performance area the head and eye movement of the avatars 1101*b* is controlled to look at various events occurring in the performance area.

Figure 11C:
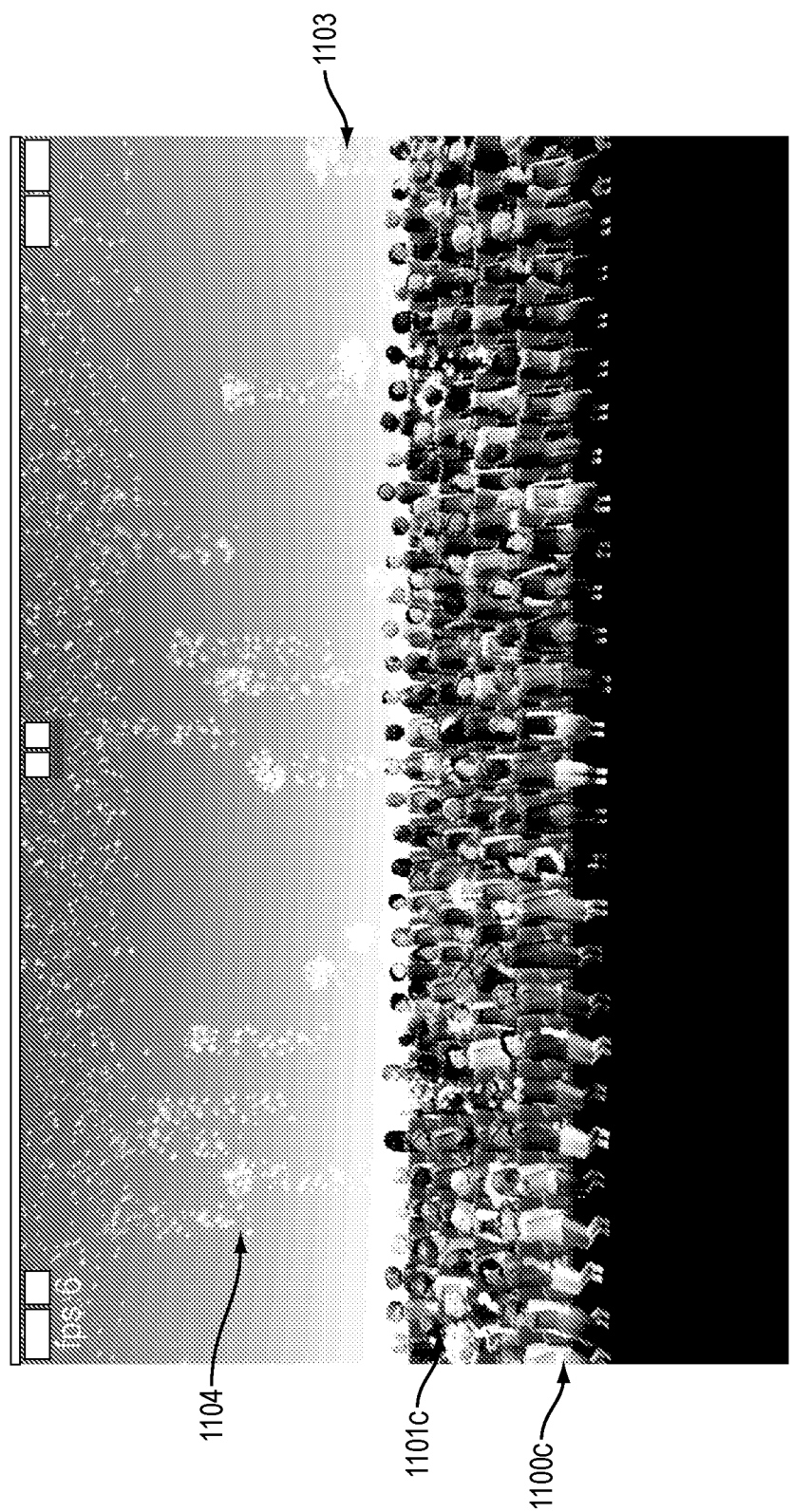

FIG. 11C shows a virtual audience 1100*c* that is composed of avatars 1101*c*. The audience 1100*c* illustrates an aggregated and collective rendering of feedback received from virtual audience members in the form of clouds 1103 and 1104. In the audience 1100*c*, the clouds 1103 and 1104 illustrate support for two different teams at a performance area. According to embodiments, the clouds 1103 and 1104 may be used to illustrate support for different teams depending upon at least one of the: color, shading, and shape of the clouds 1103 and 1104. For example, the different shades of the cloud 1103 and the cloud 1104 correspond to different teams and, thus, the cloud 1104 illustrates support for one team and the cloud 1103 shows support for the other team. In this way, an intuitive rendering of the feedback received from the audience is displayed. In embodiments, the support is not limited to being displayed via clouds 1103 and 1104 and in another embodiment, support is shown through various emojis.

Figure 12:
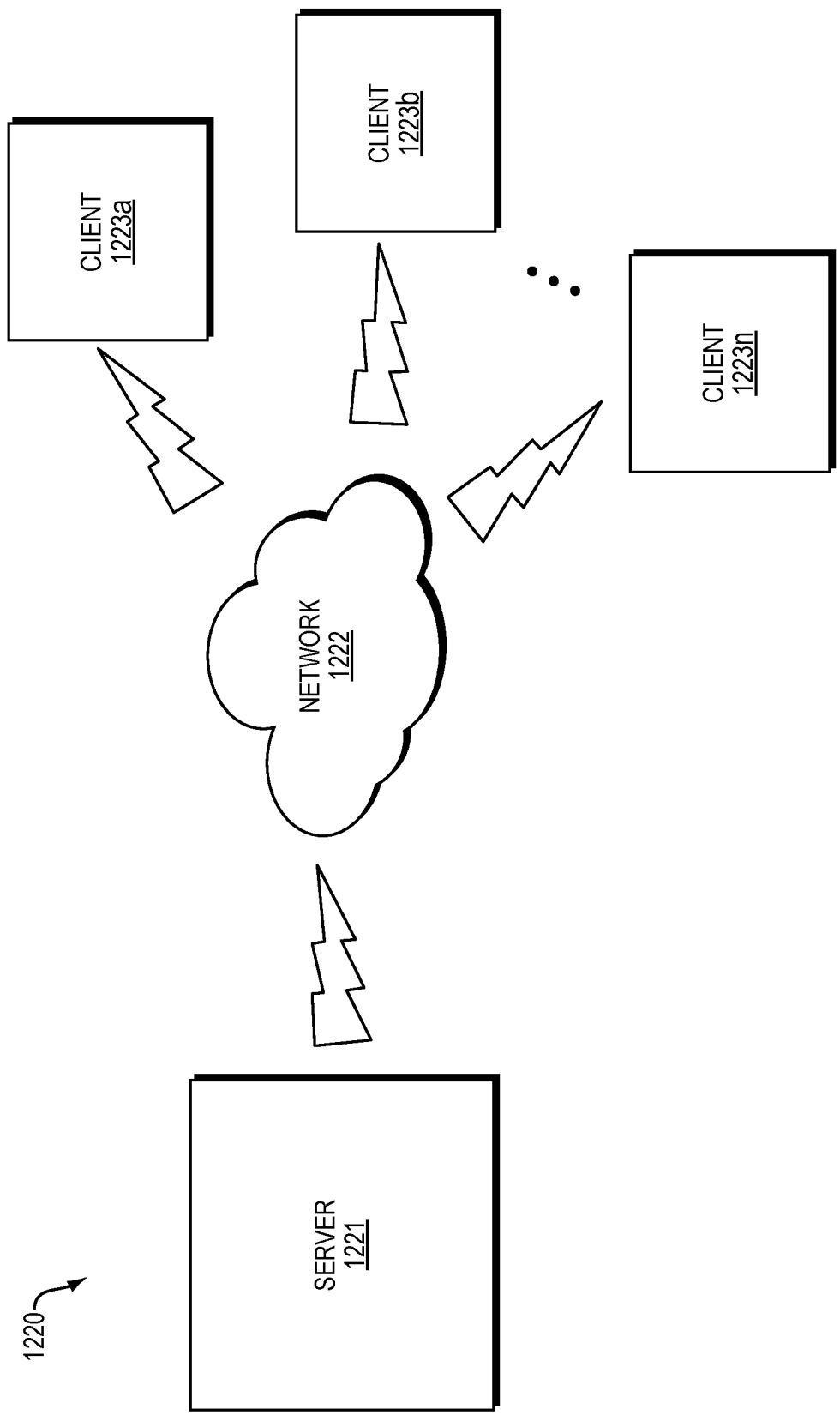
FIG. 12 is a simplified diagram of a computer network environment in which an embodiment of the present invention may be implemented.

FIG. 12 illustrates a computer network environment 1220 in which an embodiment of the present invention may be implemented. In the computer network environment 1220, the server 1221 is linked through the communications network 1222 to the clients 1223*a-n*. The environment 1220 may be used to allow the clients 1223*a-n*, alone or in combination with the server 1220, to execute any of the methods described herein. For a non-limiting example, computer network environment 1220 provides cloud computing embodiments, software as a service (SAAS) embodiments, and the like.

Figure 13:
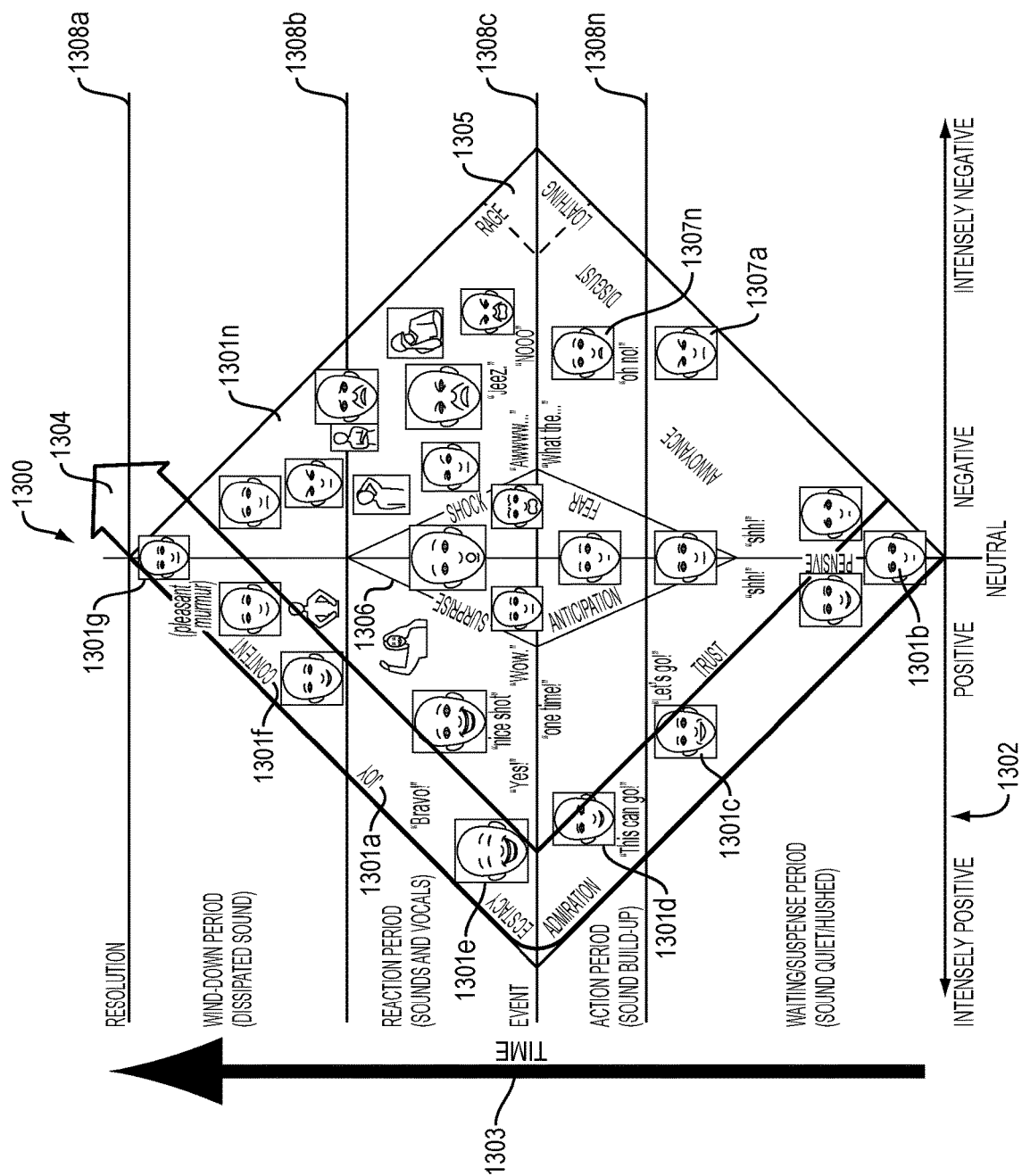
FIG. 13 depicts a graphical user interface that may be employed in an embodiment to control reactions.

FIG. 13 depicts a user interface 1300 that may be used to control audience reactions projected in an environment where audience reactions are desired, e.g., the performance area 101, and to remote audiences. The area of the interface 1300 corresponds to a variety of reactions, e.g., joy 1301*a* and sadness 1301*n*, and when a user selects an area of the interface 1300 the corresponding reaction is projected in the performance area and/or to remote audience members. Areas of the interface 1300 may correspond to any reaction type described herein. For example, areas of the interface 1300 may correspond to particular sounds and avatar animations, amongst other reactions.

In operation, the interface 1300 is depicted on a display device and a user selects the reactions to be performed. The user may perform the selection through a mouse, through touch, or via any method of selection known in the art. Further, the user may select a single reaction or a series of reactions may be selected and an order in which to provide the multiple reactions to audiences may also be indicated. For instance, in an embodiment, the order in which the reactions are selected indicates the order in which the reactions are provided. Moreover, the user may indicate how long reactions are to be played. This indication may be provided by holding a selected reaction for the amount of time the reaction is to be played or by indicating the amount of time a reaction is to be played via an input device, e.g., entering the length of the reaction via a keyboard. A user may also select multiple reactions in succession and each reaction may be projected at the same time.

Further, the interface 1300 may be configured so that a user can easily select emotions in an order that the emotions will typically be desired to be played. For example, the interface 1300 is configured so that a user can start at the bottom and drag his finger to the top and the avatars will go through desired reactions in the order that his finger is dragged. In the interface 1300, this is accomplished by putting reactions on a spectrum 1302 from intensely positive on the right to intensely negative on the left. Similarly, reactions are ordered from bottom to top as the reactions would typically occur over time 1303. In the interface 1300, reactions are in the order waiting/suspense period, action period, event, reaction period, wind-down period, and resolution. In this way, the interface 1300 is configured so that dragging a finger from bottom to top provides reactions that occur over time in a performance when an event occurs. To illustrate, for example if the performance is a hockey game, a user may begin with his finger on the neutral zone 1301*b* and then, if for example, a player starts skating down the ice on a breakaway and scores a goal, the user would drag his finger along the path 1304 and the reactions in the path would be provided. Thus, the reactions would start as neutral 1301*b* during normal play and then when the player starts skating on the breakaway the reactions would change to "let's go," 1301*c*, and when the player goes to shoot, the reactions would change to "this can go" 1301*d*. Then, when the goal is scored the reactions would be ecstasy 1301*a*, joy 1301*a* and then the reactions would wind down to content 1301*f* and pleasant murmur 1301*g*.

Because reactions in the interface are arranged on a spectrum, a particular portion of the interface 1300 may have any number of actual reactions associated with the selected area. For instance, zones of the interface 1300 may be associated with overlapping reactions and when such an area is selected both reactions would be provided. To illustrate, in the interface 1300, the zone 1305 is associated with both rage and loathing and thus, if the area 1305 is selected the reactions rage and loathing will be provided.

Moreover, a particular reaction, e.g., joy 1301*a* may be associated with numerous "assets." In other words, when a region that only belongs to a single reaction, e.g., joy 1301*a*, is selected, that region may provide the single reaction in multiple different ways. For example, if joy 1301*a* is selected, joy may be provided by animating avatars in a variety of different ways. In such an example embodiment, selecting a portion of the interface 1300 that is associated with multiple reactions results in providing a number of different reactions.

Further, the interface 1300 may also include transition reactions that are provided when transitioning from one selected reaction to another. These transition reactions may be part of the interface and thus selected, for example, as part of dragging a path of reactions, e.g., the path 1304, or the transition reactions may be automatically provided between reactions that are selected via the interface by a computing system implementing such an embodiment.

The interface 1300 may also be used to indicate properties of each selected reaction, e.g., the volume, number of avatars to perform the reaction, etc. For example, reaction magnitude may be indicated by selecting a reaction and pinching and zooming to decrease or increase the magnitude of the reaction respectively. Also, in another embodiment, the magnitude of selected reactions may be automatically determined via machine learning. For example, data about the performance area, event, number of live audience members, and number of remote audience members, amongst other examples may be used to automatically determine the magnitude of selected reactions. The magnitude of reactions may be determined by processing environment and/or reaction data using, for example, machine learning, a neural net etc., to determine the magnitude of reactions to be provided. In such an example, past environment, reaction, and magnitude data may be analyzed to determine the current magnitude for a selected reaction.

The interface 1300 may also include any variety of indicators to convey which portions of the interface 1300 correspond to which reactions. For instance, the interface 1300 includes labels, e.g., the label 1306 "Surprise," that indicates the reaction type associated with the corresponding portion of the interface. Moreover, the interface 1300 includes examples, e.g., the faces 1307a and 1307b, of the resulting avatar facial expressions and movements that result from selecting particular portions of the interface 1300. Further still, the interface 1300 includes the axes 1302 and 1303 and indicator lines 1308a-n to indicate which portions of the interface correspond to different reactions. It should be noted that the axes 1302 and 1303 and indicator lines 1308a-n are but one example of indicators that may be in embodiments. The user interface 1300 may be customized to include any indicator lines desired or appropriate based upon the application of the interface and/or user preference.

Moreover, it is noted that the interface 1300 is but one example of an interface that may be employed in embodiments. The interface 1300 may be tailored to include any desired reactions in any desired layout. For example, if for instance, the performance for which reactions are needed is an orchestra concert, the interface 1300 may be configured to only include positive reactions because the audience will either be cheering or neutral and no boos or negative reactions are likely to occur or be desired to be provided. Further, the reactions corresponding with portions of the interface 1300 may be tailored for specific implementations. For instance, what is extremely positive for a boxing match may be different from what is extremely positive for a ballet performance and the interface 1300 may be tailored accordingly. Further detail on customizing the interface 1300 is described hereinbelow in relation to FIG. 14.

Further still, while it is described that a user may select the various reactions to be provided via the interface 1300, embodiments of the invention are not so limited and the reactions may be automatically selected. For example, a computing system implementing an embodiment of the invention may receive reaction data and/or environment data and through analysis of the received data, automatically select reactions. In an embodiment, the reactions that are available to be automatically selected by the computing system may be limited by the reactions in the interface. The data analysis and automatic selection of reactions may be the result of machine learning where the system is trained with pairings of environment/reaction data and the corresponding selected reactions.

Figure 14:
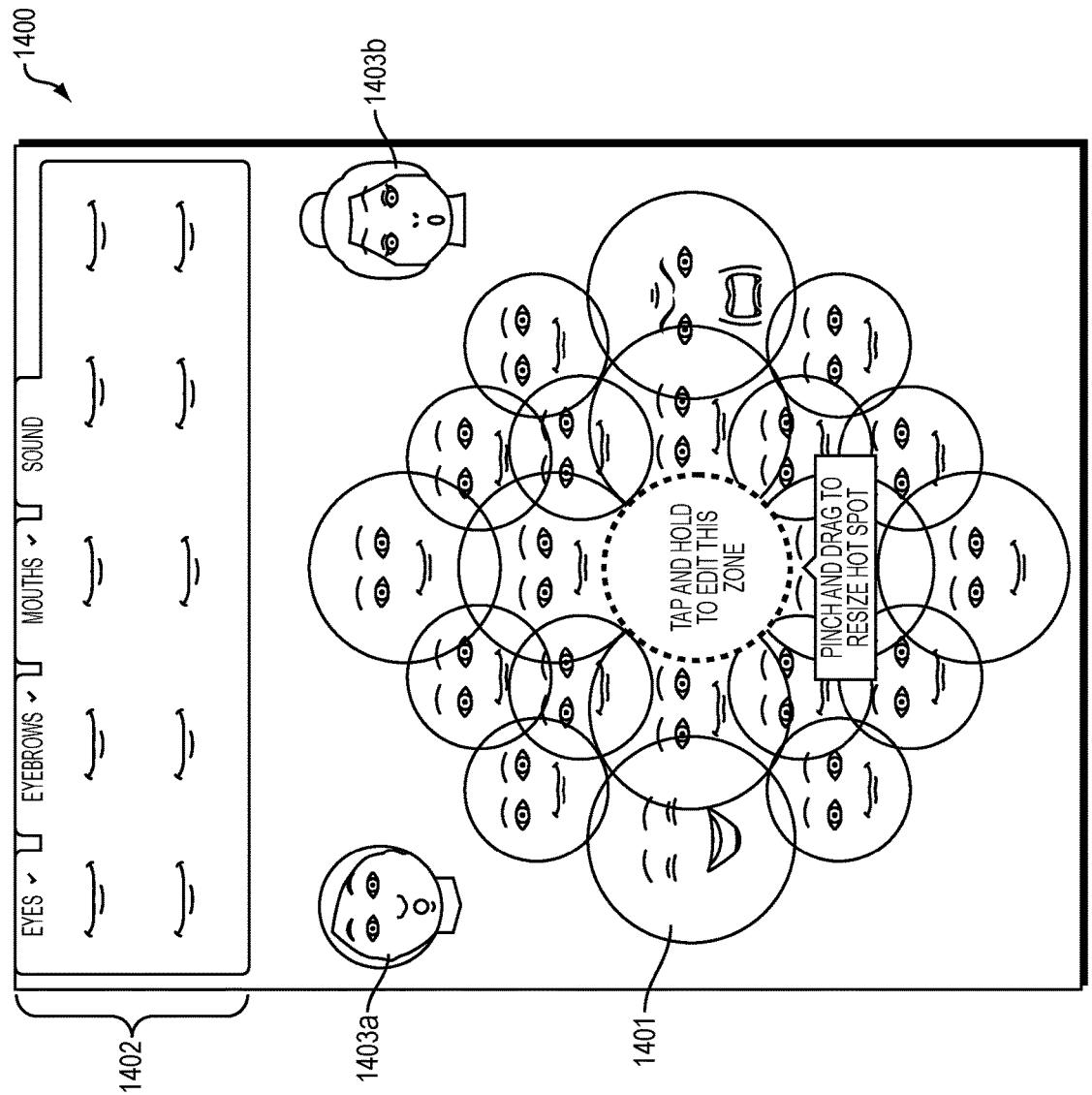
FIG. 14 illustrates a user interface that may be used in embodiments to configure an interface for controlling reactions.

FIG. 14 depicts an interface, e.g., graphical user interface, 1400 that allows a user to set-up and configure the reaction selection interface 1300 of FIG. 13. The interface 1400 allows a user to develop a layout of reactions and corresponding avatar features for an interface that is used to select reactions to be provided wherever reactions are desired, e.g., a performance area and/or to remote audience members. For example, the interface 1400 can be used to create the interface 1300. The interface 1400 allows a user to position reactions and associate reactions with features, e.g., eyes, eyebrows, mouths, sounds, gestures, volumes, animations, etc. The layout indicated using the interface 1400 creates the layout of a reaction selection controller, e.g., 1300, and regions of the reaction controller to respective assets and features of the reaction.

Each face, e.g., 1401, in the interface 1400 represents a reaction. Each face illustrates the associated eyes, eyebrows, and mouth associated with each reaction. Moreover, each face can be mapped to additional features of the reaction, such as sound and gesture. When a given face is selected a user can modify the features of the selected reaction through use of the menu 1402. The menu 1402 includes options for eyes, eyebrows, mouth, and sounds but, is not so limited and may include any additional attributes of reactions such as volume, gestures, and animation, amongst others. A user can create new faces, i.e., reactions, remove reactions, and layout reactions in any desired way through use of the interface 1400. Moreover, a user can change the size of the faces such that a portion of a reaction selection interface that is associated with a particular reaction is bigger or smaller. Moreover, a user can layer reactions such that multiple faces are directly and/or partially overlapping. When reactions, i.e., faces are layered and an area of the interface 1300 that corresponds to the overlapping reactions is selected the overlapping reactions are provided. Further, the interface 1400 also illustrates sample avatars 1403a and 1403b illustrating sample avatar renderings of a selected reaction.

The interface 1400 allows a user to create and layout a reaction selection interface, e.g., 1300, that can be used to control reactions during operation. In this way it can be said that the area of the faces depicted in the interface 1400 maps to the areas of the reaction selection interface 1300 that is used to control the reactions. Therefore, the interface 1400 can be used to create any layout desired by a user with any variety of reactions. Moreover, the interface 1400 may be used to create interfaces specifically tailored for particular applications. Further, it is noted that while the interface 1400 depicts the reactions in a diamond pattern, embodiments of the present invention are not so limited and reactions may be laid out in the interface 1400 in any desired pattern to improve user selection functionality. Further still, through using the interface 1400, a user can layout reactions in any desired order or pattern, such as laying out reactions from intensely positive to intensely negative from left to right.

Embodiments of the present invention may also be employed as training tools. For example, the avatars may be depicted in a performance area so that a performer can practice with a simulated crowd. This may be particularly useful for public speaking and sport implementations. For example, using the principles described herein, a person may practice speaking and the avatars, displays, and methods for providing reactions described herein may be employed to simulate speaking in front of a crowd of any size. Similarly, embodiments can be used to simulate playing a sport or performing in any way in front of a crowd. In such applications, the reactions provided can be tailored to be as friendly or hostile as desired and to simulate any desired number of audience members. To illustrate, in an embodiment, a baseball player practices batting in an environment where a jeering audience is simulated using the principles described herein.

Embodiments of the invention may also be used to control live audiences. For example, the tone of an event may be influenced by the reactions provided by the system, e.g., the avatars. Embodiments can be used to control the reactions of audience members. For instance, an embodiment can be used to enhance, suppress, or delay audience reactions. To illustrate, if it is desired for the local audience to laugh, the avatar audience may be depicted laughing and the sound of laughing may be projected to the local audience to influence the local audience's behavior. Likewise, reactions can be projected to remote audience members to suggest behavior, mood, and reactions to the remote audience members.

Embodiments may also be used to trigger actions in the systems described in U.S. Provisional Application No. 62/619,353 entitled "ENHANCED BILLIARD TABLE SYSTEMS AND METHODS" by Ira Lee, filed on Jan. 19, 2018 and U.S. Provisional Application No. 62/671,578 entitled "ENHANCED GAMING SYSTEMS AND METHODS" by Ira Lee, filed on May 15, 2018. For example, action in the table system described in the related application may be automatically triggered based on reaction data received from the local and/or remote audience members. For example, reaction data can be sent to the table system and the table system can be automatically triggered to perform actions based upon the reaction data. Example actions by the table system include generating automatic replays, depicting events in slow-motion, moving cameras to capture different perspectives and any actions that the table system is capable of. Similarly, embodiments of the present invention may be configured to send commands to the table system to perform actions based upon received reaction data and further still, embodiments may be configured to only send reaction data when it triggers a response in the table system. In such an embodiment, the an embodiment may be configured to store data that indicates commands to send to the table system based on received reaction data and/or store data that indicates parameters, e.g., type, magnitude, etc. that reaction data must comply with before it is sent to the table system.

An alternative embodiment of the present invention is directed to producing media streams that include a depiction of a digital audience. For instance, in an embodiment, such functionality is provided via a plug-in in a known media stream producing software product. Through this plugin, the stream producing software allows a user to incorporate a rendering of a virtual audience in a media stream. For example, a media stream producer can modify a media stream such that the lower third of the video, in this example, includes a visual rendering of a virtual audience. Then, when the stream is viewed, this virtual audience is visible to viewers without needing any particular application or plugin because the modification was made by the stream producer and the rendering of the virtual audience is embedded in the stream itself.

Embodiments or aspects thereof may be implemented in the form of hardware, firmware, or software. If implemented in software, the software may be stored on any non-transient computer readable medium that is configured to enable a processor to load the software or subsets of instructions thereof. The processor then executes the instructions and is configured to operate or cause an apparatus to operate in a manner as described herein.

Further, firmware, software, routines, or instructions may be described herein as performing certain actions or functions of the data processors. However, it should be appreciated that such descriptions contained herein are merely for convenience and that such actions in fact result from computing devices, processors, controllers, or other devices executing the firmware, software, routines, instructions, etc.

It should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and thus, the data processors described herein are intended for purposes of illustration only and not as a limitation of the embodiments. Further, embodiments and features thereof may be implemented in any variety of combinations. Further still, it is noted that herein plural and singular words may be interchangeable where the context permits.

While this invention has been particularly shown and described with references to example embodiments thereof, it will be understood by those skilled in the art that various changes in form and details may be made therein without departing from the scope of the invention encompassed by the appended claims.

What is claimed is:

1. A system for generating a virtual audience, the system comprising:
    a communications interface configured to:
        provide a digital feed from a performance area to a remotely located audience; and
        receive feedback from the remotely located audience;
    a controller configured to provide an output at the performance area corresponding to at least a portion of the received feedback;
    one or more sensors configured to detect one or more events at the performance area; and
    at least one display proximally located to the performance area and configured to:
        calculate a focal score for at least one of the one or more events detected by the one or more sensors, wherein the focal score for the at least one of the one or more events is based on at least one of an event location, an event magnitude, a sound location, or a motion location;
        depict a representation of at least a portion of the remotely located audience, wherein the representation comprises at least one digital avatar corresponding to the portion of the remotely located audience; and
        animate a selected one of the at least one digital avatar based on the at least one of the one or more events detected at the performance area by the one or more sensors, a probabilistic determination and the calculated focal score for the at least one of the one or more events, wherein the animation comprises head and eye movement of the selected avatar.

2. The system of claim 1 wherein the remotely located audience comprises a plurality of remotely located audiences each at a geographic location, and:
    the communications interface is further configured to receive feedback from each of the plurality of remotely located audiences; and
    the controller is further configured to aggregate the feedback received by the communications interface from each of the plurality of remotely located audiences, wherein the output provided by the controller at the performance area is based on the aggregated feedback.

3. The system of claim 1 wherein:
    the communications interface is configured to provide the digital feed to the remotely located audience by connecting to at least one electronic device of at least one member of the remotely located audience; and the feedback received by the communications interface comprises a signal representing motion of the electronic device of the at least one member of the remotely located audience, wherein the signal representing motion of the electronic device represents at least one of contact between the at least one member of the remotely located audience and the electronic device, and movement of the electronic device, wherein the contact is at least a clapping gesture between the electronic device and the member.

4. The system of claim 1 wherein the communications interface is configured to:
provide the digital feed comprising a broadcast of an event at the performance area after a time at which the event occurred;
receive the feedback after the time at which the event occurred; and
receive additional feedback after the time at which the event occurred,
wherein the controller is further configured to aggregate the feedback with the additional feedback.

5. The system of claim 1 wherein:
the controller is further configured to:
determine an audience output to be provided to a subset of the remotely located audience, with at least one member of the remotely located audience included in the subset, wherein the audience output determined by the controller includes aggregated feedback that is generated by the controller from feedback received at the communications interface from multiple members of the remotely located audience; and
synthesize the feedback received by the communications interface from the remotely located audience with the aggregated feedback in determining the audience output; and
the communications interface is further configured to provide the determined audience output to the subset of the remotely located audience.

6. The system of claim 5 wherein the audience output determined by the controller informs at least one member of the remotely located audience of impropriety of the received feedback.

7. The system of claim 1 wherein the controller is further configured to:
provide the output at the performance area based on an event in the performance area, wherein, in providing the output at the performance area based on the event in the performance area, the controller delays providing the output based on a component of the event in the performance area, wherein a simulation of the event is used to provide the output at the performance area as a result of the component of the event in the performance area.

8. The system of claim 1 wherein the feedback received by the communications interface is from a plurality of members of the remotely located audience and the controller is configured to aggregate the feedback received from the plurality of members of the remotely located audience to provide the output at the performance area, and wherein the controller is configured to utilize frequency a particular feedback type occurs in the aggregated feedback to provide the output at the performance area.

9. The system of claim 1 wherein the communications interface is further configured to ban a member of the remotely located audience based on an internet protocol address associated with the banned audience member.

10. The system of claim 1 wherein the output provided by the controller at the performance area comprises at least one physical change to the performance area.

11. The system of claim 1 wherein the feedback received by the communications interface comprises voice feedback, wherein the controller is further configured to remove language from the received voice feedback, wherein the removed language comprises offensive language.

12. The system of claim 1 wherein:
the communications interface is further configured to receive local feedback from an audience located local to the performance area; and
the controller is configured to provide the output at the performance area at a time determined based on when the communications interface receives the local feedback, wherein the output at the performance area provided by the controller is based on at least one of a number of remotely located audience members, past feedback, an event type, an event gravity, a current score of an event, a completion percentage of an event, the local feedback, or a likelihood of an event.

13. The system of claim 1 wherein the at least one display is configured to:
depict a plurality of digital avatars, wherein a number of the plurality of digital avatars is proportional to the number of members in the remotely located audience; and
highlight one or more of the depicted plurality of avatars based on received feedback associated with the one or more highlighted avatars.

14. The system of claim 1 wherein the at least one display is configured to, one of:
depict the at least one digital avatar at a position selected by a member of the remotely located audience,
depict the at least one digital avatar with a sign,
customize the depicted at least one digital avatar based on input from the remotely located audience, or
animate the at least one digital avatar to render the feedback received from the remotely located audience.

15. The system of claim 1 wherein the at least one display is red to provide a three-dimensional (3D) rendering of the representation.

16. The system of claim 1 wherein the digital feed from the performance area includes biometric data regarding at least one person at the performance area.

17. The system of claim 1 wherein:
the controller is further configured to create a digital rendering of a physical object from the performance area; and
the communications interface is further configured to provide the created digital rendering to the remotely located audience.

18. A method for creating a virtual audience, the method comprising:
providing a digital feed from a performance area to a remotely located audience;
receiving feedback from the remotely located audience;
detecting one or more events at the performance area;
calculating a focal score for at least one of the one or more events, wherein the focal score for the at least one of the one or more events is based on at least one of an event location, an event magnitude, a sound location, or a motion location;
depicting a representation of at least a portion of the remotely located audience, wherein the representation comprises at least one digital avatar corresponding to the portion of the remotely located audience; and animating a selected one of the at least one digital avatar based on the at least one of the one or more events detected at the performance area by the one or more sensors, a probabilistic determination and the calculated focal score for the at least one of the one or more events, wherein the animation comprises head and eye movement of the selected avatar.

19. A computer implemented method of facilitating remote audience participation, the method comprising:
receiving a digital feed from a performance area at a device associated with a user;
sending first feedback to the performance area;
receiving output from the performance area corresponding to second feedback from a plurality of remotely located audience members;
receiving third feedback from the performance area regarding a digital avatar depicted in the performance area;
selecting the digital avatar based on the third feedback; and
displaying data related to the performance area in a plurality of panels of a graphical user interface on the device associated with the user, wherein a first panel of the plurality of panels depicts the digital avatar selected based on the third feedback.

20. The method of claim 6 wherein,
a second panel depicts one of (i) the received output from the performance area, (ii) event scores or (iii) a plurality of digital avatars corresponding to the plurality of remotely located audience members,
a third panel depicts the digital feed, and
a fourth panel depicts an avatar associated with the user.

21. The method of claim 20 further comprising:
receiving a notification that the user is being featured;
sending a user expression in response to the notification; and
depicting, in the second panel, the avatar associated with the user performing the sent user expression amongst the plurality of digital avatars corresponding to the plurality of remotely located audience members.

* * * * *